United States Patent [19]

Gueldenpfennig et al.

[11] 3,806,661

[45] Apr. 23, 1974

[54] TRANSFER CIRCUIT

[75] Inventors: Klaus Gueldenpfennig, Penfield; Uwe A. Pommerening, Webster; Stanley L. Russell, West Webster, all of N.Y.

[73] Assignee: Stromberg-Carlson Corporation, Rochester, N.Y.

[22] Filed: Sept. 29, 1972

[21] Appl. No.: 293,681

[52] U.S. Cl. ........................ 179/18 BD, 179/18 HA

[51] Int. Cl. ............................................ H04m 3/54

[58] Field of Search.................... 179/18 BD, 18 HA

[56] References Cited

UNITED STATES PATENTS

| | | | |
|---|---|---|---|
| 2,958,734 | 11/1960 | Forrest | 179/18 BD |
| 3,725,599 | 4/1973 | Krock | 179/18 BD |

*Primary Examiner*—Ralph D. Blakeslee

*Attorney, Agent, or Firm*—Charles C. Krawczyk; William F. Porter, Jr.

[57] ABSTRACT

A transfer system for providing transfer services to trunk circuits involved in connections between inside and outside parties. In response to a signal from the inside party, a trunk circuit is connected to any one of a plurality of transfer circuits through a switching network. The transfer circuit seizes the common control through a line circuit and transmits dial pulses received from the trunk circuit to complete a transfer connection to a transfer party. If the transfer party is an inside party, the transfer circuit, in response to a subsequent signal from the initial inside party, sets up a conference connection. When the initial inside party hangs up, the transfer circuit enables a transfer common control circuit to seize the common control and to set up a second connection between the transfer party and the trunk and thereafter releases the transfer connection through the transfer circuit. Safeguards are provided to assure that the second connection is properly established prior to the disconnection of the transfer connection.

31 Claims, 13 Drawing Figures

FIG I

PATENTED APR 23 1974 3,806,661

SHEET 02 OF 11

TRANSFER CIRCUIT

BACKGROUND OF THE INVENTION

This invention pertains to telephone systems in general, and more particularly to apparatus for use in a private automatic branch exchange (PABX) to provide automatic transfer features.

In the usual line to line type of telephone call through a telephone central exchange, the calling party dials the number of the called party as listed in the telephone directory. In this type of arrangement, the calling party knows the party whom he is calling. However, in the case of corporations or large offices that are serviced by a private branch exchange, the outside world calling party (a party connected to the private branch exchange through a trunk circuit) may not know the name of the person he wishes to contact and desires to speak to somebody that is assigned a certain area of responsibility. Generally, the operator is dialled and the operator will attempt to complete a connection to the appropriate party. A private branch exchange without any automatic transfer capability requires the services of the operator for call transfer. Hence, should the calling party be connected to the wrong person, or if the called party happened to be at another location, the inside party (a party serviced by the private branch exchange) is required to signal the operator for recall and to have the outside world party reconnected to another telephone line. The recall of the operator may be required several times before the proper party is reached, or else perhaps the outside world party may be required to make several calls.

In peak traffic times the operator may be busy extending various calls wherein no operator would be readily available for recall. As a result, a good deal of time is wasted by the outside party, the operator and the inside party in attempting to establish the transfer. Furthermore, even if the proper inside party may have been reached, the inside party may desire consultation with another inside party, either alone or, through a conference connection. Without automatic transfer, the inside party is again required to recall the operator to set up the connection to the additional inside party.

The transfer feature includes equipment for use with a PABX that provides for the automatic connection of an additional party to an established connection between an inside party and the outside world, for either private consultation or conference, under the control of the initially called or calling inside party. In the common control type of systems the connections between parties are established through switching networks by the use of common control equipment which is seized to establish the connections and then is subsequently released. The transfer circuit in common control systems must be able to recognize a request for transfer services. When the inside party generally signals for a transfer circuit he receives dial tone and dials the number of the other party to be connected. After the other party has been connected, the inside calling and called parties can then either confer in private or be connected in a conference circuit with the outside world party. If the party called by the inside party was a trunk connection, the conference capability should be denied thereby preventing telephone connections between parties in the outside world that would be billed to the PABX office.

In samll offices, the transfer service is often included in the trunk circuits. The trunk circuit in such cases detects the transfer request for signal (hook flash, push-button, etc.) to seize the common control. The various trunk circuits in common control systems cannot be selected for connection only to those parties having transfer class of service. Hence, each of the trunk circuits is required to include an entire transfer circuit and an additional port connection to the switching network. The circuitry for providing the transfer feature in such an arrangement would be included in each outside world connection whether or not used or needed. The added port in each trunk results in a substantially larger and more expensive switching network and adds to the cost and the size of the trunk.

Although the use of transfer circuits in the trunks may be feasible in small PABX systems, this approach is too costly for use in large PABX systems. It would be much more economical if transfer circuits were provided as a pool of common circuits that can be selected for use as required. Under such an arrangement, the number of transfer circuits provided in a PABX will depend upon the size of the exchange along with transfer traffic requirements. Hence, the number of transfer circuits in such an arrangement can be greatly reduced, and the cost of the PABX accordingly reduced.

The transfer feature should be under the control of an inside PABX party. For purposes of simplifying the explanation in this patent application, party A will be designated as the party requesting transfer services. Party A, in addition, is required to be connected to the outside world by a call that either party A established or the outside world established. Party B, for the purposes of this patent application, shall be designated as the party to be connected via the transfer circuit. It is a desirable feature of a transfer arrangement that party A and party B could communicate in private prior to any conference connection or transfer. Hence, the transfer circuit should provide for an initial connection between parties A and B and then if desired provide for a conference connection between parties A and B and the outside world.

If the conference connection is established between parties A and B and the outside world and party A terminates, there is no need for tying up a transfer circuit since only two parties remain connected. Hence, it is desirable if the transfer arrangement provides for the rerouting of the call between called party B and the outside world, thereby reducing the holding time on the transfer circuits and making the transfer circuit available for other transfer requests. The reroute feature should be automatic. The transfer arrangement should include facilities for seizing a register for automatically dialling the number of party B and initiating a direct connection through the network between party B and the outside world, and then terminating the connection to party B via the transfer circuit. During this reroute process it is important that the communications between the outside world and party B remain uninterrupted and the direct connection through the network be properly made. If the direct connection through the network is not properly established, the outside world may possibly be connected to another busy party, or to another free party. In such a case the connection between party B and the outside world, once the transfer circuit is released, is lost. Hence, it is very important that the proper safeguards are provided to assure that the direct connection is between the outside world and party B before the connection through the transfer circuit is released.

There are other times at which party A, after requesting transfer services, may have made a mistake in dialling and hangs up shortly thereafter. For example, party A may have only dialled three digits of a four digit number, or may have dialled a nonlisted number. In such event, it is important that the connection to the outside world is not terminated. Some means should be included to reestablish a connection between party A and the outside world, and if party A does not answer, to establish a connection to the operator.

The transfer system should also be adaptable so that transfer services can only be extended for those having a transfer class of service. Since the transfer service request is under the control of the inside party, the system including transfer features should also be able to detect the actual transfer class of service assigned to the various parties so that the party with a no-transfer class of service is not inadventently allowed to be able to transfer calls because of a telephone connection made to it as a result of transfer facilities.

It is therefore an object of this invention to provide a new and improved transfer system for telephone exchanges.

It is also an object of this invention to provide a new and improved transfer system for telephone exchanges including a pool of transfer circuits, any free one of which can be connected to a trunk circuit for providing transfer services.

It is also an object of this invention to provide a new and improved transfer system for telephone exchanges wherein after a transfer connection has been established, and the party which has requested transfer service hangs up, a reroute process is initiated that replaces the transfer connection by a direct connection through the telephone exchange.

It is a further object of this invention to provide a new and improved transfer system for telephone exchanges wherein the reroute process is only available if the transfer party is an inside party.

It is a still further object of this invention to provide a new and improved transfer system for telephone exchanges wherein rerouting is provided under the control of a circuit that is common to a plurality of transfer circuits and is used only during reroute and then released.

It is also an object of this invention to provide a new and improved transfer system for telephone exchanges including means for rerouting transfer connections with safeguards to assure that the transfer connections are not released until the reroute connections have been properly established.

It is also an object of this invention to provide a new and improved transfer system for telephone exchanges wherein a transfer requested party and the transfer party can consult in private.

It is also an object of this invention to provide a new and improved transfer system for telephone exchanges for providing a conference connection between the transfer requesting party, the transfer party, and an outside party.

It is still a further object of this invention to provide a new and improved transfer system for telephone exchanges wherein a conference connection including two outside parties is prohibited.

It is a further object of this invention to provide a new and improved transfer system for telephone exchanges for reringing the transfer requesting party after the party hangs up and in the event that the transfer connection to the transferred party cannot be established.

It is still a further object of this invention to provide a new and improved transfer system for telephone exchanges for enabling the trunk circuit to request operator services in the event that the transfer requesting party does not answer to reringing signals within a preset period of time.

It is still a further object of this invention to provide a new and improved transfer system for telephone exchanges wherein the trunk circuit stores the transfer class of service of the inside party connected thereto, and in the event of a reroute connection the trunk stores the class of transfer service of the transferred party, thereby preventing the transfer party having a no transfer class of service from achieving transfer service capabilities by means of a transfer reroute connection.

BRIEF DESCRIPTION OF THE INVENTION

A transfer system for use in common control telephone exchanges wherein telephone connections are established between inside and outside parties through trunk circuits. The trunk circuits, in response to a signal from the inside party connected thereto, are connected through a switching network to any one of a plurality of transfer service circuit means. The arrangement is such that the plurality of transfer circuit means are a pool of service circuits, any free one of which can be connected to a trunk circuit requesting transfer service. Hence, the transfer circuit means are only used when needed, the number of which is to be provided in any system is a function of transfer traffic requirements.

The transfer service circuit means are responsive to the connection of a trunk circuit thereto and the receipt of dial pulses from the inside party to complete a transfer connection from the trunk circuit to the dialled transfer party (such as another inside party or outside party). In response to the termination of the inside party requesting the transfer services, circuit means establish a second (reroute) connection between the transfer party and the trunk circuit directly through the telephone exchange and the transfer connection is thereafter released. By establishing the second (reroute) connection, the transfer circuit means used in providing the transfer services is released to service other transfer requests. The second connection is a normal connection through the exchange where the transfer party is substituted for the original inside party.

According to a feature of the invention, if the transfer party is an outside party and the original inside party hangs up, the reroute process is inhibited and the transfer connection released. This prevents the use of transfer systems for establishing connections solely between outside parties.

In accordance with a feature of the invention, the trunk circuits include storage means for storing the class of service of an inside party connected thereto at the time the connection is made. When the transfer party is connected to the trunk via the second (reroute) connection, the transfer class of service of the transfer party is now stored in the trunk circuit. Therefore, a party assigned to a no transfer class of service will not be able to achieve transfer service capabilities through a transfer reroute connection.

According to an embodiment of the invention, the transfer service circuit means include a plurality of transfer circuits, each one of the transfer circuits being adapted to be connected through the switching network to separate trunk circuits requesting transfer services for establishing the transfer connections. In addition, a transfer common circuit means is provided for each transfer service circuit means to service the plurality of transfer circuits in response to reroute signals generated by transfer circuits when the original inside (transfer requesting party) hangs up to complete the second (reroute) connection and release the transfer connection. Such an arrangement has the advantage of including the circuits for establishing the second (reroute) connection in a single means that need only be connected to a transfer circuit for the time required to establish the second (reroute) connection and then is subsequently released for use with other transfer circuits.

In accordance with another feature of the invention, each of the transfer circuits includes storage means for storing the dial signal received from the inside transfer requesting party via the connected trunk circuit. The transfer common includes a scanning circuit for detecting the transfer circuits requesting reroute and associating the transfer common thereto to initiate the reroute process by transmitting the dial signals stored in the transfer circuits to the telephone exchange to complete the second (reroute) connection.

A further feature of the invention includes a comparison circuit in the transfer common for comparing the dial signals transmitted to that stored in the transfer circuit to inhibit the release of the transfer connection unless a comparison is made. Circuit means are also included for inhibiting the release of the transfer connection if the dialled party is not busy, thus, further assuring that a proper connection has been made before releasing the transfer connection. Hence, the communication between the transfer party and the outside party is continuously maintained during the reroute process through the transfer connection, which connection is not released until the second (reroute) connection is established properly.

A still further feature of the invention includes circuit means in each of said transfer circuits for detecting a signal from the transfer requesting party after the transfer connection is complete for establishing a conference connection. Hence, the original inside party and the transfer party can consult in private before being connected in the conference connection with the outside party. If the transfer party is an outside party, if desired, the transfer connection can be released so that conference connections between two outside parties and an inside party cannot be established.

In accordance with another feature of the invention, circuit means are provided in each of the transfer circuits for determining if the transfer connection can be established, such as the case wherein the transfer requesting party has improperly dialled and then subsequently hung up, to rering the party for attempting to reestablish the original telephone connection. In the event the party does not answer the rering signals, the transfer circuit includes circuit means for signalling the trunk circuit to generate an operator request and thereafter release. Hence, the connection between the outside party and the telephone system will not be lost in the event that the transfer connection cannot be established.

The transfer common includes a gating circuit enabled by a circuit means for sequentially receiving and storing the individual dial signal digits from the transfer circuit and for transmitting the dial signals with a predetermined interdigit spacing therebetween. The transfer common circuit also includes a comparison circuit for comparing the digits stored in the transfer circuit with that transmitted to the common control.

DETAILED DESCRIPTION OF THE INVENTION

GENERAL SYSTEM DESCRIPTION

Figure 1:
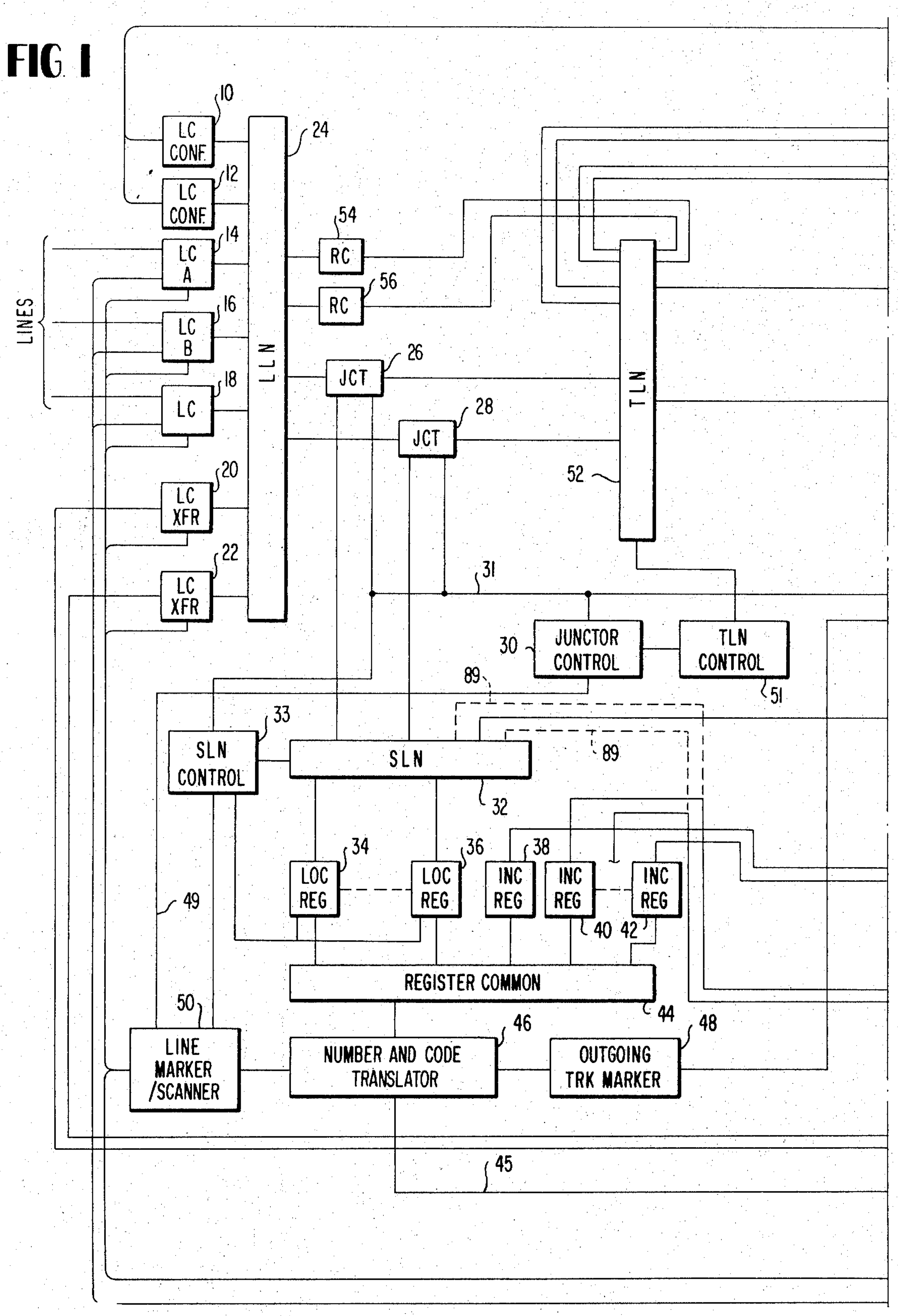
FIGS. 1–3 disclose a block diagram of a private automatic branch exchange including the transfer system of the invention.
Figure 2:
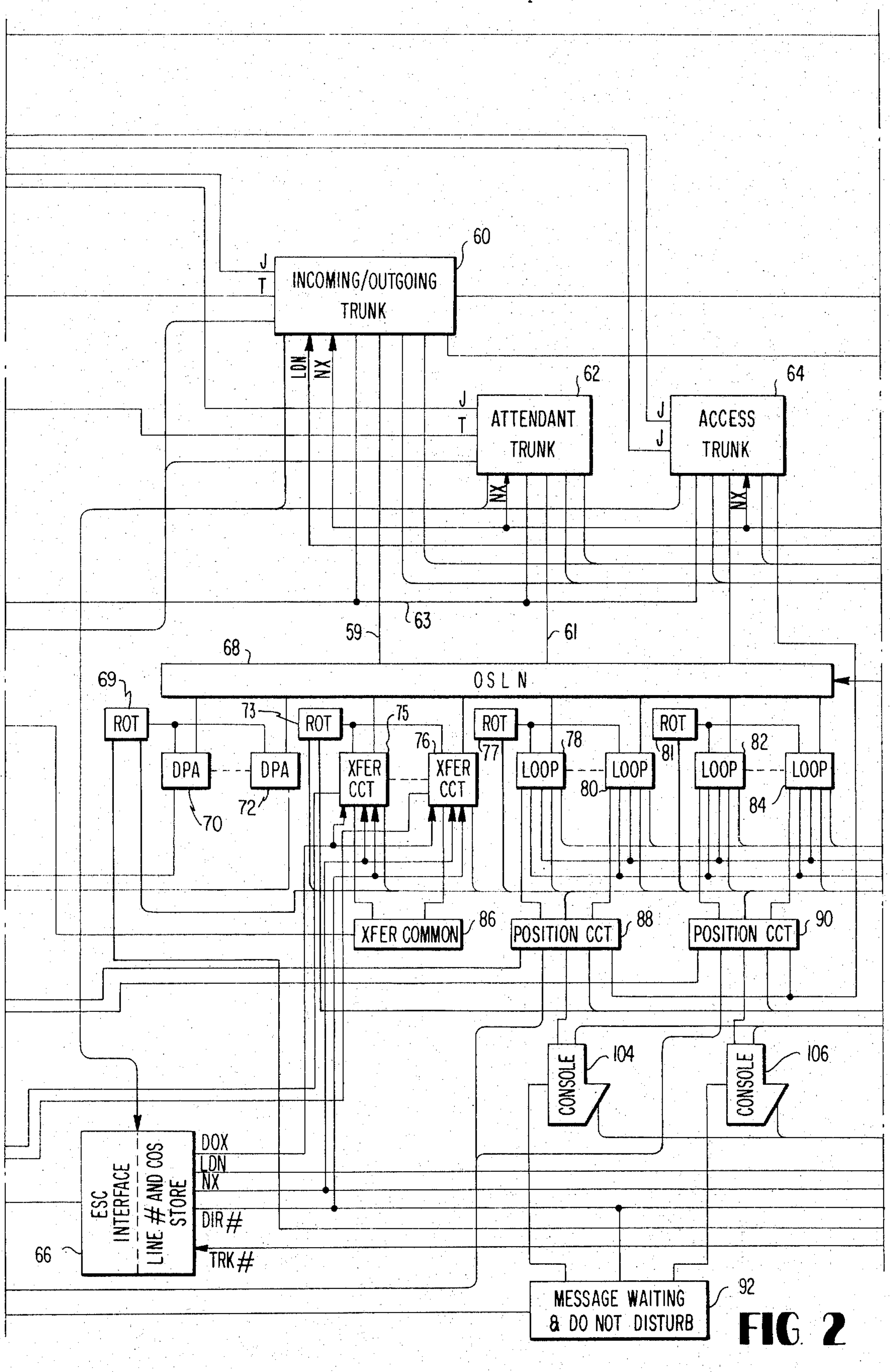
Figure 3:
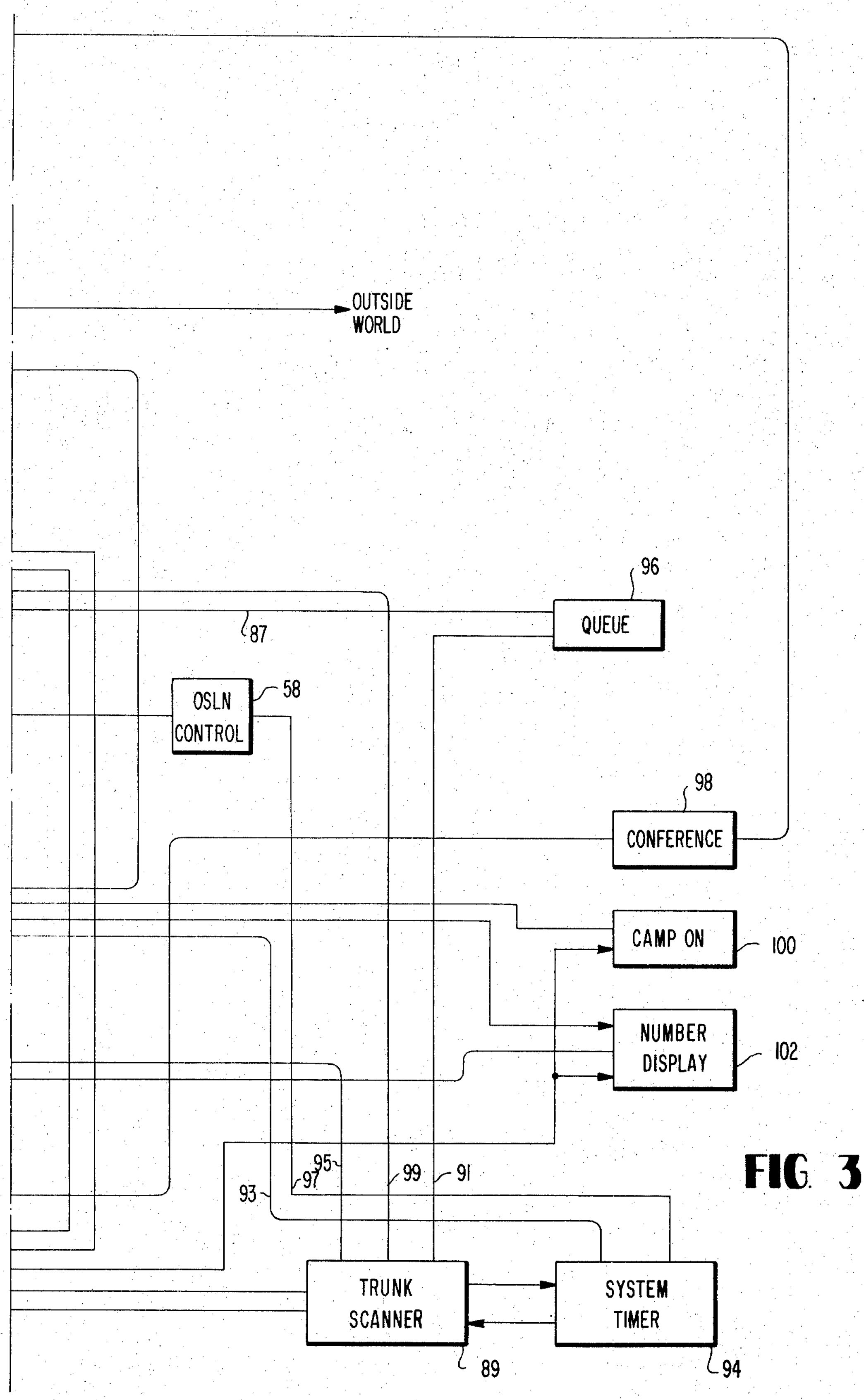

It will be seen from the drawings that FIG. 1 represents that portion of the system which relates to an electronic switching center; while, FIGS. 2 and 3 provide equipment which forms part of a private automatic branch exchange. The operation of the entire system of FIGS. 1, 2 and 3 is explained in detail in our copending U.S. Pat. application entitled, "Private Automatic Branch Exchange," Ser. No. 293,518, filed jointly herewith and assigned to the same assignee as the present invention.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN 24 is connected to a plurality of line circuits such as the conference line circuits 10 and 12, typical subscriber line circuits 14, 16, 18 and transfer line circuits 20 and 22. The number of subscriber line circuits provided vary in number in dependence upon the telephone service to be offered, but may typically exceed four thousand lines. The typical subscriber line circuits 14, 16 and 18 are more fully described in copending U.S. Pat. application Ser. No. 153,233, filed on June 15, 1971, in the name of Otto Altenburger, which is assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path finding need be performed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 is more fully described in copending U.S. Pat. application Ser. No. 100,571, now U.S. Pat. 3,705,268, in the name of Otto Altenburger, which application is assigned to the same assignee as the present invention.

The junctors 26 and 28 serve as the focal points for all local originating type traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off hook condition, and is used for both originating and terminating types of traffic. In the event of originating traffic, the line scanner stops when an off hook condition is detected and transmits the information from its counter circuits to a marker circuit to mark the particular line circuit and enables the SLN control 33 to initiate a path finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through the junctor control 30 to the ringing control 54 or 56. The line scanner-marker circuit 50 is more fully described in copending U.S. Pat. application Ser. No. 101,091, filed on Dec. 23, 1970, in the names of Gunter Neumeier and Otto Altenburger, which is assigned to the same assignee as the present invention.

The trunk link network (TLN) 52 provides for the termination of the local traffic to local subscribers, the termination of incoming calls from other exchanges to the local subscribers, and for the connection of incoming calls from other exchanges to other external exchanges. The TLN 52 includes a three stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also to the trunk circuits.

Path finding through the trunk link network 52 is performed under the control of the TLN control 51 and the junctor control 30. The TLN control 51 and the junctor control 30 work together in completing the termination portion of a call, whether it is an internally terminated call, or an outgoing call to a distant office. The number and code translator 46 and line scanner-marker 50 are used to complete calls to local lines, and the number-code translator, together with the outgoing trunk marker 48 complete calls to the trunks. The outgoing trunk marker 48 is fully described in a copending U.S. Pat. application entitled, "Outgoing Trunk Marker," Ser. No. 103,267, filed on Dec. 31, 1970 in the names of Otto Altenburger and David Stoddard and assigned to the same assignee as the present invention.

The path finding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit.

The path finding sequences through the SLN and the TLN along with the equipment associated therewith are more fully described in copending U.S. Pat. application Ser. No. 153,221, now U.S. Pat. No. 3,729,593 in the names of Otto Altenburger and Robert Bansemir, which application is assigned to the same assignee as the present invention.

Looking now to the portion of the system illustrated in FIGS. 2 and 3, which includes the private automatic branch exchange (PABX) portion, five types of trunk circuits may be provided in the telephone system of the present invention; however, only an incoming/outgoing trunk 60 providing direct inward and direct outward dialling, an attendant trunk 62, and access trunk 64 are illustrated. The access trunks 64 are used solely by the operators to originate calls to the subscriber stations; while, the attendant trunks 62 are used by the local stations for access to the operator, from which they can be extended to another trunk or local station. The incoming/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunk 62 and serves to select a trunk circuit for a call originated by one of the local subscribers in response to the dialled digits as analyzed by the number and code translator 46. The incoming/outgoing trunk 60 is fully described in a copending U.S. Pat. application entitled, Trunk Circuit Having Selective Interface Combinations, Ser. No. 293,571, filed for Klaus Gueldenpfennig and Stanley L. Russell jointly herewith and which is assigned to the same assignee as the present invention.

An operator service link network (OSLN) 68 controlled by an OSLN control 58 is provided for connecting the trunks 60, 62, and 64 to various service circuits such as the dial pulse acceptors 70 and 72, transfer circuits 75 and 76 and loop circuits 78–80 and 82–84. The operation of the OSLN 68 and the OSLN control 58 and the method of signalling through the OSLN is fully described in two copending U.S. Pat. applications entitled, "Path Finding System For a Multistage Switching Network," now U.S. Pat. No. 3,729,591 in the name of Klaus Gueldenpfennig and Stanley L. Russell and entitled, "Telephone Switching Network Signalling System," now U.S. Pat. No. 3,707,140 in the name of Klaus Gueldenpfennig, Stanley L. Russell and Uwe A. Pommerening, both of which patents are assigned to the same assignee as the present invention. The loop circuits are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer 94 and trunk scanner 89 forming the common control for the PABX portion of the system, and the position circuits 88 and 90 also are directly connected to dedicated incoming registers, such as 40 and 42 respectively, associated with the register common 44 and number and code translator 46 in the ESC portion of the system. If it is desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The connection of any of the trunks to any of the service circuit groups is fully disclosed in our copending U.S. Pat. application entitled, "Private Automatic Branch Exchange Circuit Complex," filed jointly herewith and assigned to the same assignee as the present invention. The operation of the position and loop circuits is fully disclosed in our copending U.S. Pat. application entitled, "Operator Loop Complex," Ser. No. 293,752, filed jointly herewith and assigned to the same assignee as the present invention.

The incoming/outgoing trunk circuit 60 may also be connected through the OSLN to one of several dial pulse acceptors 70 and 72, which although shown separately for convenience are part of the dedicated incoming registers 38 and 40, respectively. The dial pulse acceptors 72 and 74 are also preselected by a rotary 69 for connection through the OSLN 68 to a trunk upon request for service and are accessed by the trunk scanner 89 via the rotary 69.

The incoming/outgoing trunk 60 may also be connected through the OSLN 68 to one of several transfer circuits such as 75 and 76 which are connected respectively to dedicated transfer line circuits 20–22 at the input of the line link network 24. The transfer circuits are also preselected by a rotary 73 in preparation for a request for connection through the OSLN 68 to an incoming/outgoing trunk 60. The transfer operation includes the use of a transfer common 86 which is connected to the transfer circuits 75 and 76 and has a dedicated input to the service link network 32 for obtaining access to a local register 34 and 36. The transfer circuits 75 and 76 are also connected to the system timer 94 and trunk scanner 89 via the rotary 73.

A queue 96 is provided in association with the incoming/outgoing trunks 60 and attendant trunks 62 to provide for servicing of requests for the operator on a first come-first served basis. The operation of the queue 96 is fully described in our copending U.S. Pat. application entitled, "Queue For Electronic Telephone Exchange," Ser. No. 108,380, now U.S. Pat. No. 3,702,380 and is assigned to the same assignee as the present invention. The queue 96 is connected between each of the incoming/outgoing and attendant trunks and the trunk scanner 89 and serves to forward to the trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to scan an operator, a request for a transfer circuit, or the request for a DPA in connection with a direct inward dialled call. A requested service circuit is available when the request is received in the trunk scanner 89, a stop scan signal will be generated and the request for service signal will be forwarded to that service circuit.

The system timer 94 applies enabling time slots to each of the service circuit groups such as the position circuits 88 and 90 and the transfer circuit rotary 73 in sequential order simultaneously with the more rapid sequential enabling of the dial pulse acceptors 70 and 72. A service circuit is enabled for connection to a trunk only during the enabling time slot assigned to its group. For instance, a loop circuit can be connected to a trunk only when its associated position circuit is enabled by the system timer 94. When a stop scan signal has been generated in the trunk scanner 89 and a request for service signal has been forwarded to all the groups containing the type of service circuit requested, the service circuit preselected by that rotary which is first enabled by the system timer 94 (or first position circuit to be enabled by the timer 94 in the case of a loop circuit) will be seized and connection through the OSLN 68 from the trunk to the selected circuit will be effected.

The system in accordance with the present invention also provides for various special features circuits including a message waiting and do not disturb system 92, a conference system 98, and a camp on system 100. The camp on system is disclosed in our U.S. Pat. Nos. 3,676,606 and 3,679,835 both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PABX portion of the system and its various special features circuits require certain information in connection with a communication connection, such as the calling and called line circuit directory numbers, the class of service of the various parties involved and the numbers of the trunks which may be involved in the call. This type of information is not retained by the ESC portion of the system once the connection through that portion of the system is established and so the present invention provides a PABX–ESC interface and line number store 66 which receives information concerning the subscriber line circuits and the class of service of these circuits at the time the connection through the ESC is effected so that this information may be received and stored in the PABX portion of the system for further use in connection with the special service features. For example, each time a trunk is marked for connection to a subscriber station, the data concerning the subscriber station including the directory number and class of service thereof will be forwarded via line 45 to the ESC interface and line number store 66 for storage therein or for transfer into the trunk circuit itself. For example, the transfer class of service will be forwarded to the trunk circuit upon connection thereof to the subscriber station by enabling of the NX data bus from the store 66 each time a connection to a trunk is effected. Signalling concerning dialled information from the number and code translator 46 and the PABX portion of the system is also effected through the ESC interface 66, such as signalling in connection with the dialling from the outside world of the listed directory number of the system by enabling the LDN lead or dialling by an inside subscriber of "0" on a transfer operation by enabling the DOX lead.

GENERAL TRANSFER OPERATION

The transfer feature can be activated by a PABX party only if that party is engaged in a call via an incoming/outgoing trunk 60; it makes no difference whether that party originated or received the call. This feature provides the means whereby a PABX party (hereinafter referred to as party A) having the proper class of service (COS) can, by means of flashing his telephone hookswitch, call in an available transfer circuit and, thereby, dial another PABX party (hereinafter referred to as party B). If party A does not have the proper class of service, the hook flash will recall the operator.

Party A has complete control of the call at all times. When the party A — party B connection is initially established, the distant trunk party (referred to as the outside world or OSW) is automatically placed on hold so that party A can privately consult with party B if so desired. By an additional, single flash of the telephone hookswitch, party A can remove the hold condition from the OSW thereby establishing a three way conference between party A, party B, and the outside world.

At this point in the call, party A has two choices in call control. If party A's hookswitch flashes for a third time, party B and the transfer circuit are released and the call reverts back to the original state; that is, the call is again handled only by the trunk circuit. If, on the other hand, party A elects to release, party B will remain connected to the outside world through the transfer circuit and the transfer circuit will commence its rerouting process. In this operation, the transfer circuit calls in the transfer common circuit which, in turn, calls in a local register. Party B and the OSW are unaware of the rerouting process taking place and conversation is carried on normally. Once the local register 34 or 36 is associated with the transfer common circuit 86, the transfer common outpulses the directory number of party B into the register. After the last outpulsed digit is received, the register signals the transfer common by means of a switchthrough (SW) mark. The transfer common compares the called number in the ESC interface and store 66 with the number that it has outpulsed and determines if it is busy. If there is no comparison, or the called line circuit is not busy the SW mark is not passed on to the transfer circuit and no switching occurs and after a preset time period the register is released, wherein the transfer common will reseize a register and outpulse the number a second time. This sequence will continue until a comparison is obtained, or until the call is terminated in the transfer circuit by party B and/or the OSW going on hook.

If called number comparison is obtained in the transfer common during the SW mark, the transfer common passes the SW mark on to the associated transfer circuit. The transfer circuit, in turn, extends the SW mark, over the OSLN 68 to the connected trunk circuit 60, causing the trunk circuit to call in the junctor control 30 in order to affect switchthrough to party B via the trunk. When switching is complete, two transmission paths exist from the OSW to party B, one via the transfer circuit and one via the trunk circuit. The connection through the transfer circuit is now dropped. The transfer operation will now be described in greater detail in various types of calls with and without transfer class of service.

RECALL FROM INCOMING/OUTGOING TRUNK (NO TRANSFER)

Once a connection has been established between a subscriber station and the outside world through an incoming/outgoing trunk 60, the subscriber station may initiate a transfer of the connection to the outside world to another subscriber station by a hookswitch flash, if the subscriber station has the proper class of service; or if the subscriber station does not have a transfer class of service, the operator may be summoned by a hookswitch flash. Each time a connection is made to an incoming/outgoing trunk, or any other trunk in the system, the NX data from the ESC interface 66 indicating whether the party has a transfer class of service available is stored in the trunk. Thus, when the incoming/outgoing trunk detects a hookswitch flash from the subscriber station, depending upon whether or not the NX data stored in the trunk indicates that a transfer is available, the trunk will either initiate connection to a local register through the operator service link network OSLN, or connect through the operator service link network OSLN and an available loop and position circuit to an operator.

Assuming a call has been established between party A having line circuit 14 and the outside world through an incoming/outgoing trunk 60 and further assuming that party A does not have a transfer class of service available, when party A flashes the hookswitch the NX data stored in the trunk identifies the hookswitch flash as a request for the operator. Accordingly, when the incoming/outgoing trunk is scanned by the trunk scanner 89, a QRFS signal is generated from the trunk and applied to the queue 96 along with the identification number of the trunk. The number at the output of the queue 96 is then compared with the number of the trunk being scanned, as provided by the trunk scanner 89, and if a correspondence is detected, the queue forwards a GRFS signal to the trunk scanner to stop the scanner if an operator is available. If the queue is taken out of service this fact is detected by all trunks so that request for operator service will result in generation of a GRFS directly by the trunks. A mark is then extended from the trunk scanner to the position circuits which are being scanned by the system timer and the first available loop applies the mark to the operator service link network OSLN. The OSLN is marked at the other side of the incoming/outgoing trunk via line 59 and a connection is then established between an incoming/outgoing trunk and the operator through the OSLN, loop and position circuit to the operator.

Upon answering, the operator will be connected both to party A and the outside world and therefore will be capable of connecting these parties to a third party if desired, or party A may release and permit the operator to connect the outside world to another party.

RECALL FROM INCOMING/OUTGOING TRUNK (TRANSFER)

As already indicated, once a connection is established between a subscriber station and the outside world, the subscriber can effect a transfer to a second subscriber station by flashing the hookswitch if the transfer class of service is available to him. This transfer operation to a second subscriber station is carried on automatically without the services of the operator, as will be described below, Thus, once a connection has been established to the outside world, if the subscriber wishes to recall the operator, more than just a flash of the hookswitch will be necessary.

Assuming that party A having line circuit 14 is connected to the outside world through an incoming/outgoing trunk 60 and further assuming that the party A has a transfer class of service available, as indicated by the NX data stored in the incoming/outgoing trunk 60, a recall to the operator is initiated by a flash of the hookswitch. Since the NX data stored in the trunk indicates a transfer class of service is available, the trunk will generate an XRFS signal when it is next scanned by the trunk scanner 89, which signal will be applied directly on the bus 99 to the trunk scanner. Trunk scanning will be stopped at this point if an available transfer circuit is preselected by the rotary 73 and a mark will be extended from the trunk scanner through the transfer common 86 via bus 95 through the preselected transfer circuit 74, for example, to the operator service link network OSLN. The incoming/outgoing trunk 60 extends a mark on line 59 to the other side of the OSLN which then connects the trunk to the preselected transfer circuit 74.

Each transfer circuit is connected to a dedicated transfer line circuit connected at the input of the line link network 24. The transfer circuit causes the trunk 60 to place the outside world on hold and accesses its transfer line circuit to provide an off hook condition which can be detected by the line marker and scanner 50. The line marker and scanner 50 then actuates the junctor control, marks the line link network input from the transfer line circuit and actuates the SLN control 33 to select an available local register. The transfer line circuit 20 is then connected through the line link network 24, an available junctor 28 and the service link network 32 to an available local register 34, for example. The local register returns dial tone through the transfer line circuit 20, transfer circuit 74, operator service link network 68, incoming/outgoing trunk 60, trunk link network 52 and line link network 24 to line circuit 14 so that party A may dial the number of a second subscriber station to which connection is requested, or in the present case, may request connection to the operator.

Party A dials the digit "0" which is recognized by the number and code translator 46 as a request for the operator. The translator thus suppresses the generation of a switch mark in the register, which would normally be extended to the junctor and junctor control, and instead signals the ESC interface 66 via line 45 to generate a signal DOX indicating that the operator has been dialled on a transfer call. The ESC interface and store 66 marks the DOX bus which forwards the request via the transfer circuit to the incoming/outgoing trunk through the OSLN.

Receipt of the DOX indication in the incoming/outgoing trunk inhibits the XRFS signal and causes the generation of a QRFS signal which is forwarded to the queue along with the identity of the incoming/outgoing trunk. The system then proceeds to establish a connection from the incoming/outgoing trunk through the operator service link network OSLN to an available loop and position circuit to obtain the services of an operator in the manner described previously.

AUTOMATIC TRANSFER

As indicated in the foregoing operation for recall with transfer, once party A having line circuit 14 is connected to a local register 34 through an incoming/outgoing trunk 60, operator service link network 68, transfer circuit 74, transfer line circuit 20, line link network 24, junctor 28, and service link network 32 as a result of a hookswitch flash, dial tone is returned to party A from the local register 34 enabling the dialling of a second subscriber station. Assume party A having line circuit 14 dials the number of party B having line circuit 16. The dialled digits are received in the local register 34 and analyzed by the number and code translator 46, which accesses the line marker and scanner 50 to mark the line circuit 16. The directory number of party B is also transmitted via the ESC interface and store 66 to a called party storage circuit in the seized transfer circuit. A switch mark is also extended from the register to the junctor to access the junctor control, which marks the trunk link network. Path finding through the trunk link network 52 then establishes a connection from party A having line circuit 14 through the line link network 24, junctor 26, trunk link network 52, incoming/outgoing trunk 60, operator service link network 68, transfer circuit 74, transfer line circuit 20, line link network 24, junctor 28, trunk link network 52, ringing control 56, and line link network 24 to line circuit 16 and party B, for example, Ringing is then extended from the ringing control to party B and ring-back is extended to party A.

If party B does not answer, party A may flash the hookswitch a second time which is detected on this occasion in the transfer circuit and causes release of the transfer circuit and all of the ESC elements connected thereto. Under these conditions, party A will then be again connected solely to the outside world through the incoming/outgoing trunk 60.

If party A releases before party B answers, the outside world is released from hold by the transfer circuit and receives ring-back from the ringing control. The transfer circuit starts a time-out which will automatically connect the outside world to the operator if the party B does not answer within a prescribed time. Once the time-out signal has been generated indicating that the prescribed time has elapsed, this signal will access the incoming/outgoing trunk 60 and cause a QRFS signal to be generated in the trunk initiating the connection of the trunk to an available operator so that the operator may handle any further requests from the outside world for service. On the other hand, if the party B answers before the time-out signal is generated, the parties will be connected and a rerouting of the connection will be automatically initiated in a manner to be described below.

If party A does not release before party B answers, parties A and B will be connected for communication while the outside world remains on hold from the transfer circuit. Under these conditions, party A may flash the hookswitch which will cause release of the hold in the transfer circuit and place the three parties in the conference connection. At this point, if party B releases, the transfer circuit will release along with the ESC equipment associated therewith so that party A will remain connected to the outside world solely through the incoming/outgoing trunk. On the other hand, if party A releases, party B will be connected to the outside world through the transfer circuit and a rerouting of the connection will be automatically intitated in a manner to be described below.

REROUTING-TRANSFER COMPLETE

The parties A and B having line circuits 14 and 16, respectively, may be in a three-way conference with the outside world, or the outside world may still be on hold with parties A and B connected together as a result of a transfer operation. Under these circumstances, party A is connected from the line circuit 14 through the line link network 24, junctor 26, trunk link network 52, incoming/outgoing trunk 60, operator service link network 68, transfer circuit 74, transfer line circuit 20, line link network 24, junctor 28, trunk link network 52, and line link network 24 to the line circuit 16, for example. As is quite apparent, if party A releases at this point, party B will be connected to the outside world through the incoming/outgoing trunk 60 via a rather roundabout path including a number of pieces of equipment rather than the more direct path through a single junctor and the trunk link network 52. Accordingly, the transfer circuit in accordance with the present invention under these circumstances initiates an automatic rerouting of the connection to establish a parallel connection from line circuit 16 through an available junctor and the trunk link network 52 to the incoming/outgoing trunk 60 so as to permit release of the more roundabout path through the transfer circuit.

When party A releases under the conditions set forth above, the release is detected in the transfer circuit which automatically releases the hold on the outside world if that condition still exists. The transfer circuit then extends a release signal to release party A and the switch train to line circuit 14. An RFS signal is also extended from the transfer circuit to the transfer common 86 to acquire the services of that circuit. The transfer common 86 has a direct appearance at the input of the service link network 32 so as to provide for connection to a local register. The transfer common receives the called line number which was stored in the transfer circuit at the time of the marking operation for the original transfer connection and outpulses this number to the local register through the service link network 32. The number and code translator 46 then extends the directory number designated by the outpulsed digits via line 45 to ESC interface and store 66 back to the transfer common where the number is compared to the number outpulsed to insure that the correct number is being switched.

If the comparison made in the transfer common proves that the correct line is being switched, the number and code translator 46 under control of the transfer common causes the line marker and scanner 50 to enter a forced marking mode of the busy party B to override the normal busy condition of the line circuit 16 and mark the line circuit appearance at the line link network 24. At the same time, the local register extends a mark through the transfer common 86, transfer circuit 74 and operator service link network 68 to mark the junctor output of the incoming/outgoing trunk 60. Premature ring trip of the ringing control associated with the connection is also effected to prevent a ringing of the parties. Path finding through the trunk link network 52 then effects a connection between line circuit 16 and the incoming/outgoing trunk 60 to the outside world, which path is in parallel to the previous path extending from the line circuit 16 through the transfer circuit to the incoming/outgoing trunk 60. Once the parallel path has been established, the switch mark extending from the register ends and the transfer circuit along with the transfer common and associated ESC equipment releases.

It should be noted in connection with this operation that the original path from the line circuit 16 through the transfer circuit and incoming/outgoing trunk to the outside world is maintained during the entire rerouting operation so that communication between the parties is not interrupted. It is only after the second parallel path has been established that the original path is released so that no interruption of the communication between the parties is possible. Indeed, for a short period of time communication between the parties is effected over both of the parallel paths.

INCOMING/OUTGOING TRUNK

Figure 4:
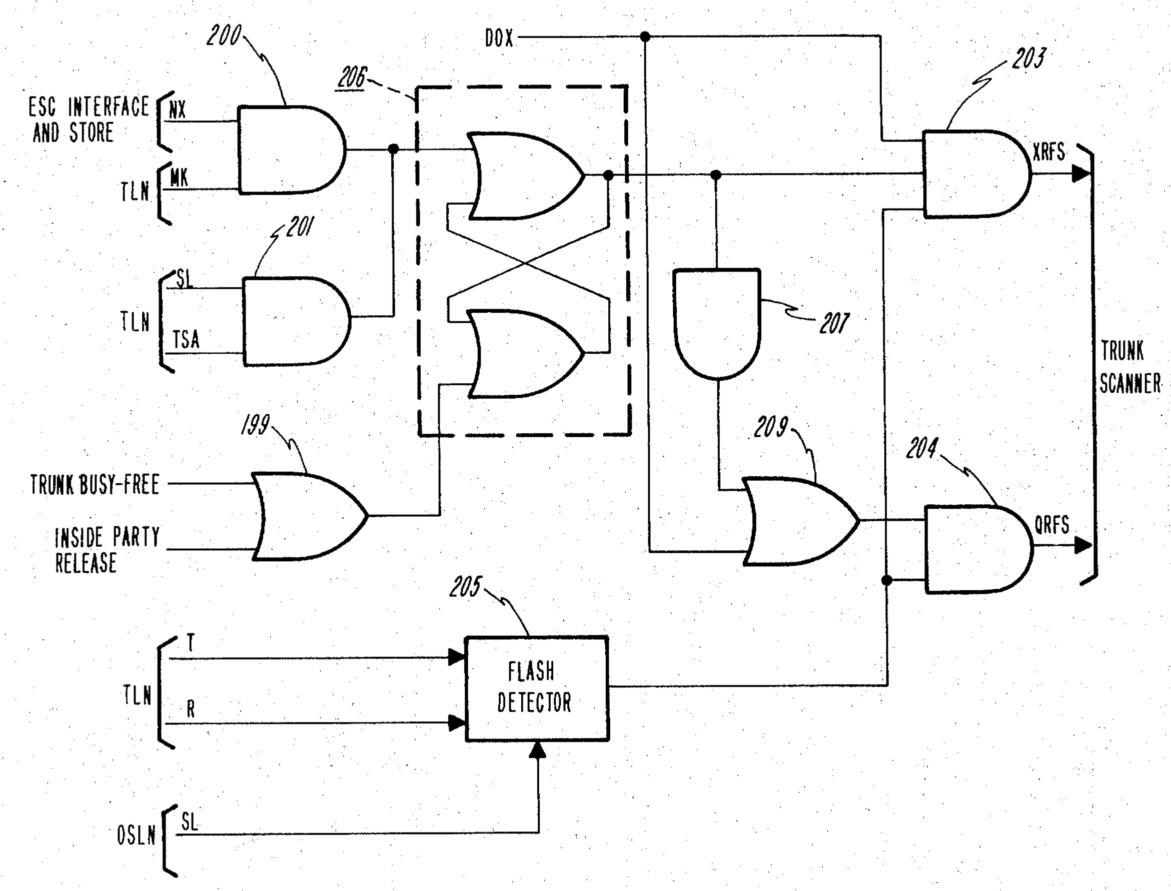
FIG. 4 includes a schematic diagram of the portion of an incoming/outgoing trunk circuit of FIG. 2 used in generating transfer service request signals.

The purpose of the no transfer class of service (NX COS) store circuit (illustrated in FIG. 4) in the incoming/outgoing trunk 60 is to control whether a transfer request (XRFS) or a general request (QRFS) is generated when a subscriber hook flash is detected by the hook flash detector 205. If a flip-flop 206 is set, an XRFS is generated, if reset a QRFS is generated. This store may be set by any of two means:

1. when a call is being extended to or from an incoming/outgoing trunk 60 to a subscriber having a no transfer class of service, the system marks the NX COS bus at the time of the connection. Only this trunk may interrogate the NX COS bus at this time due to the TLN mark signal MK applied to the gate 200 which in turn sets the NX COS flip-flop 206, and
2. if a call is being extended to this incoming/outgoing trunk 60 in an outgoing mode from an access trunk 64 or an attendants trunk 62 by the operator for a subscriber having a no transfer class of service (which the class of service was stored in the extending trunk at the time the subscriber was connected to that trunk) the NX COS flip-flop 206 is set by way of gate 201. The gate 201 is enabled by time slot signal TSA being extended over the holding sleeve through the TLN from the extending trunk at the time of connection.

Once set, the NX COS flip-flop 206 may be reset by the OR gate 199 only if the trunk becomes idle, that is, all connections have been released, or if the inside party disconnects or is forcibly disconnected from the trunk.

As long as the NX COS flip-flop 206 is reset, gate 203 (XRFS) is enabled by the hook flash detector 205 and gate 204 (QRFS) is inhibited. If a DOX signal is received indicating the operator has been dialled, the gate 203 is inhibited and the gate 204 is enabled to generate the general request QRFS. If the flip-flop 206 is set, the gate 203 is inhibited and the gate 204 is enabled. The hook flash detector 205 constantly monitors the tip/ring pair of the inside party. If a momentary open on the pair is detected which is greater than 200 milliseconds but less than 2 seconds the hook flash detector 205 will generate a flash detected output to enable the appropriate gate 203 or 204. This hook flash detector will remain in the ON mode until either the OSLN sleeve is detected or the trunk becomes idle. A holding sleeve signal from the OSLN indicates that the appropriate service circuit has been connected to the other side of the OSLN matrix.

ESC INTERFACE AND STORE

Figure 5:
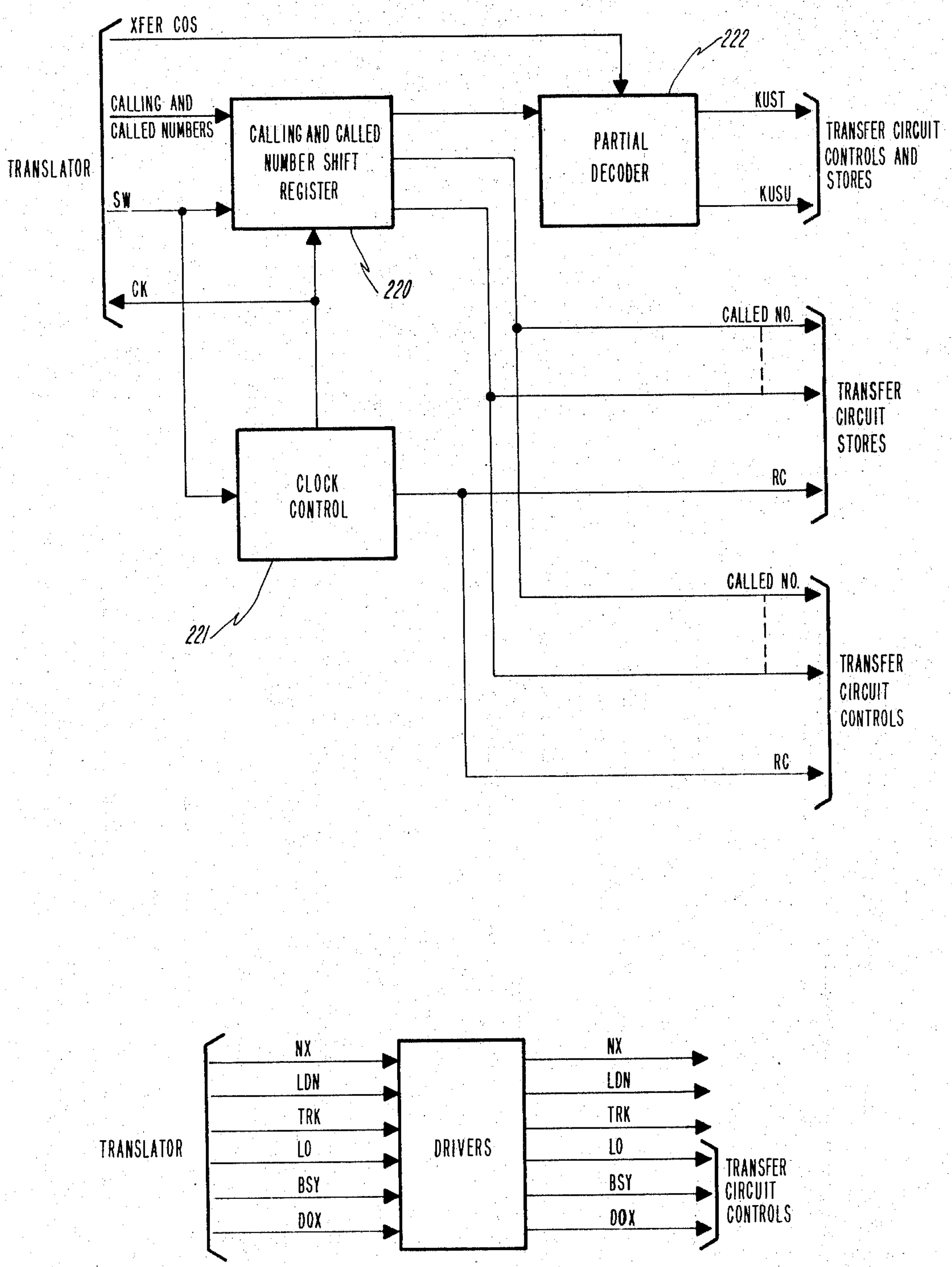
FIG. 5 is a block diagram of the ESC interface and store circuit of FIG. 2 for transmitting information concerning connections between the translator of FIG. 1 and the equipment of FIGS. 2 and 3.

A block diagram of the calling and called number storage portion of the ESC interface and store 66 is illustrated in FIG. 5. The calling and called directory numbers of the parties involved in each connection by the ESC is transmitted in serial form from the translator 46 (during the call set-up) to a calling and called number shift register 220. A clock control circuit 221 allows the transfer of the data into the register 220 and locks up when all the data is received and sends an enable signal RC to the transfer circuit controls and stores 132 and 134 (FIGS. 12 and 10), and transfer common control 136 (FIG. 6) to accept the called number data in parallel form. The clock control 221 remains locked up until the switch mark is removed, at which time the enable signal RC is pulsed and the register 220 is reset. The clock control also provides timing to the translator. The transfer line circuits 20–22 are assigned a transfer class of service which is recognized by the translator. The calling number data is transmitted to a partial decoder 222 which, in turn, is enabled by a transfer class of service signal (XFER COS) from the translator 46. The partial decoder 222 applies the signal KUST (tens digit) and KUSU (units digit) to all the transfer controls and stores 132 and 134 to address the calling transfer circuit. Each transfer circuit is assigned the same address as the transfer line circuit connected thereto. The called number in the shift register 220 is applied to all the transfer circuit stores 134, but only the transfer circuit whose store address corresponds to the calling party number will accept the data. The called number is also applied to the transfer common control 132 to be used during the reroute process.

The no transfer class of service signal NX, the listed number signal LDN, the trunk call signal TRK, the local call signal LO, the busy signal BSY and the dial operator signal DOX received from the translator 46 are transmitted to the respective circuits via the drivers 219.

TRANSFER SERVICE GROUP

Although the single rotary 73 is illustrated in FIG. 2 as controlling a single group of transfer service circuits (75 and 76), it is to be understood, that depending upon the size of the office, traffic conditions, and the expected number of transfer requests, several groups of transfer service circuits can be provided, each transfer service group having its own plurality of transfer circuits, its own transfer common circuit, and its own rotary circuit. The transfer common circuit 86, acts as a common control circuit for for the plurality of transfer circuits in its group for rerouting purposes.

Figure 6:
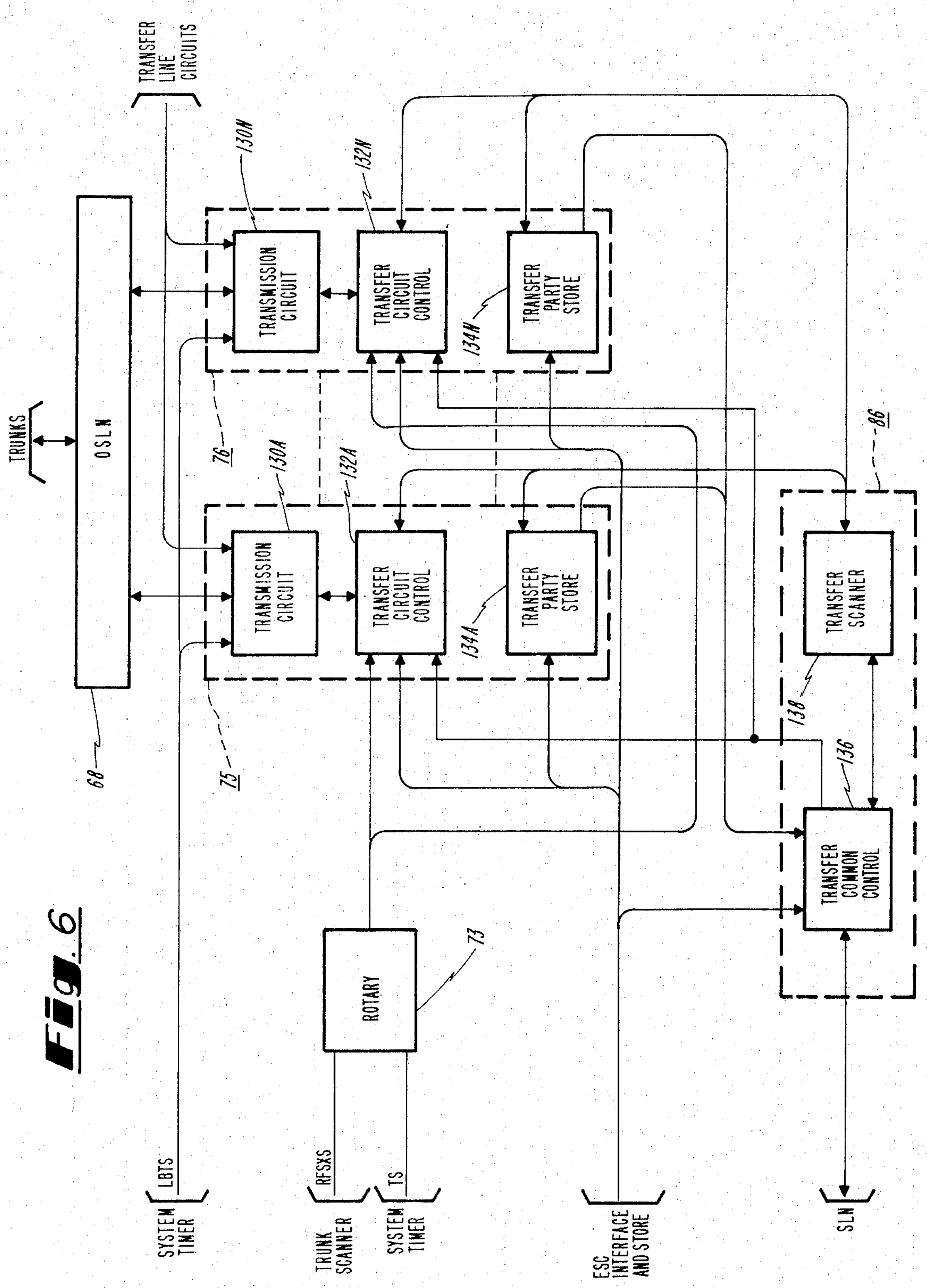
FIG. 6 includes an expanded block diagram of a single transfer service group included in the service circuit complex of FIG. 2, wherein each transfer service group includes a plurality of transfer circuits, a rotary circuit, and a transfer common.

FIG. 6 includes an expanded block diagram of a transfer service group. Each transfer circuit includes a transmission circuit 130 for providing connections between the OSLN 68 and the transfer line circuits. The transmission circuit 130 includes the transmission bridge circuits for connecting party A to party B, and to connect parties A and B and the outside world in a conference circuit. The transmission circuit 130 includes the mark and sleeve controls, and the network and path finding signalling circuits, and is operated under the control of a separate transfer circuit control 132. The transmission circuit 130 is discussed in greater detail with regard to FIG. 11.

Figure 12A:
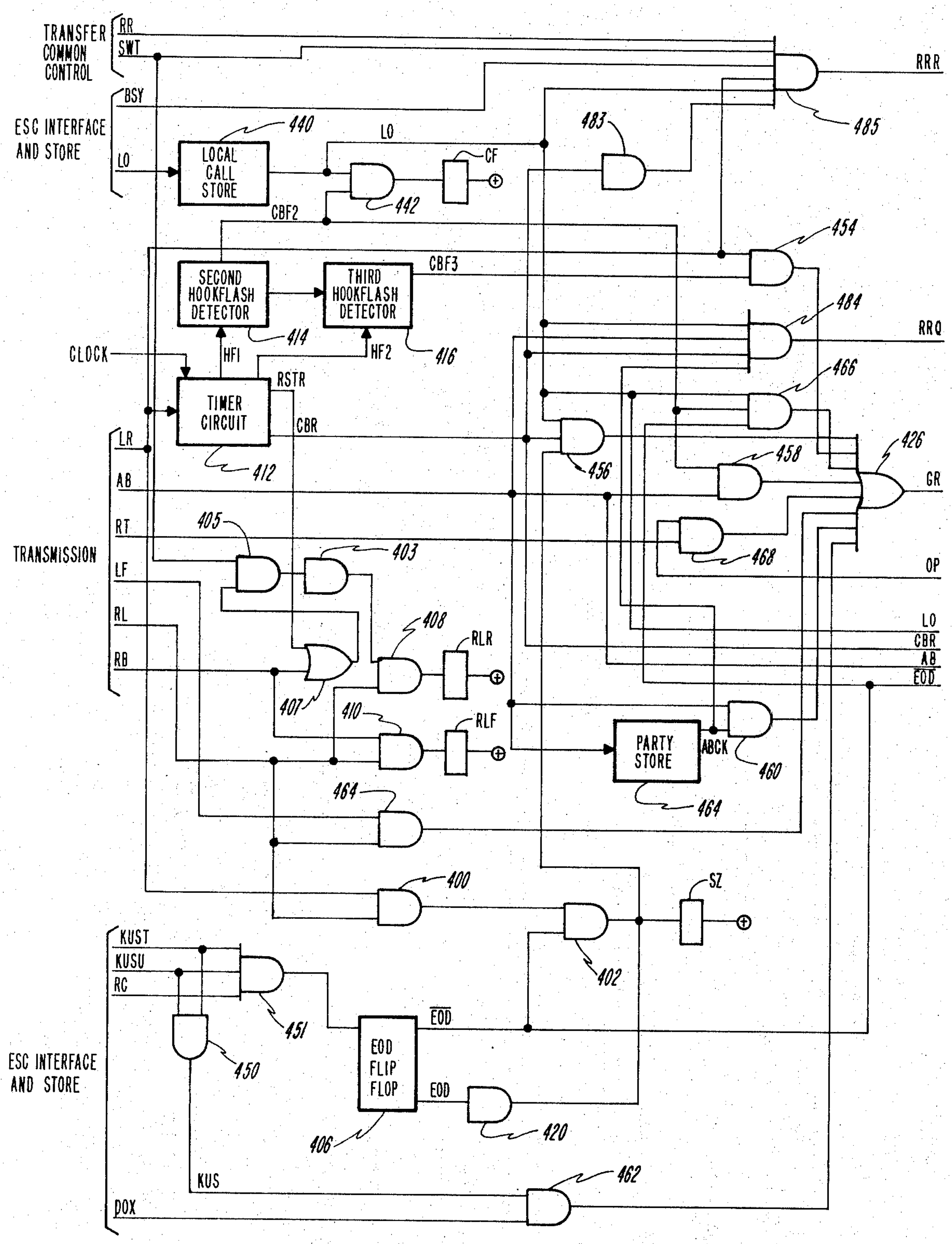
FIG. 12, which comprises of FIGS. 12A and 12B, is a schematic diagram for the transfer circuit control forming the decision making portion of each of the transfer circuits.
Figure 12B:
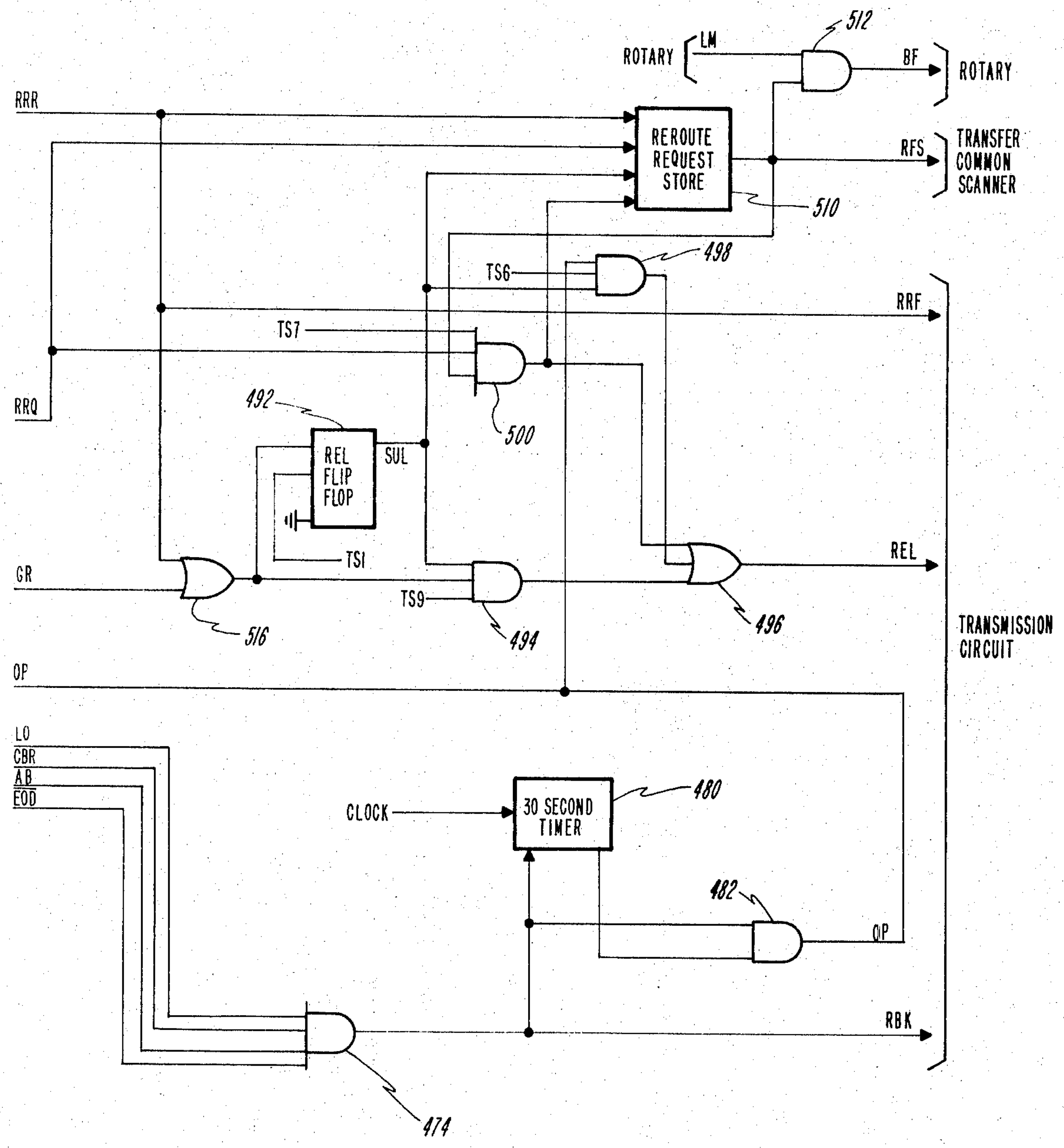

The transfer circuit control 132 is a decision making portion of the transfer circuit that responds to the off hook, hook flash, dial and termination signals of the parties to control transfer circuit seizure, dial pulse repetition, conference release, rerouting, etc., as discussed in greater detail with regard to FIG. 12. The transfer circuit control 132 is connected to the rotary 73 for preselection prior to seizure, as is explained in greater detail with regard to FIG. 7. Each transfer circuit also includes a transfer party store circuit 134 for receiving and storing the number of the called party B as provided by the ESC interface and store 66. The transfer party store is discussed in greater detail with regard to FIG. 8.

The transfer common 86 includes a transfer common control circuit 136 and a scanner circuit 138. The scanner circuit 138 continuously scans the transfer controls 132 for a request for service, and in response to such a request, associates the transfer common 86 with that particular transfer control 132 and transfer store 134. The transfer common control 136 provides for the outpulsing of the called party B number designated by the store 134, and for making comparison tests with the number in the store 134 with that received by the local register to assure that the proper number has been outpulsed. The transfer common control circuit 136 and the scanner circuit 138 are discussed in greater detail with regard to FIGS. 10 and 9.

TRANSFER CIRCUIT ROTARY

Figure 7:
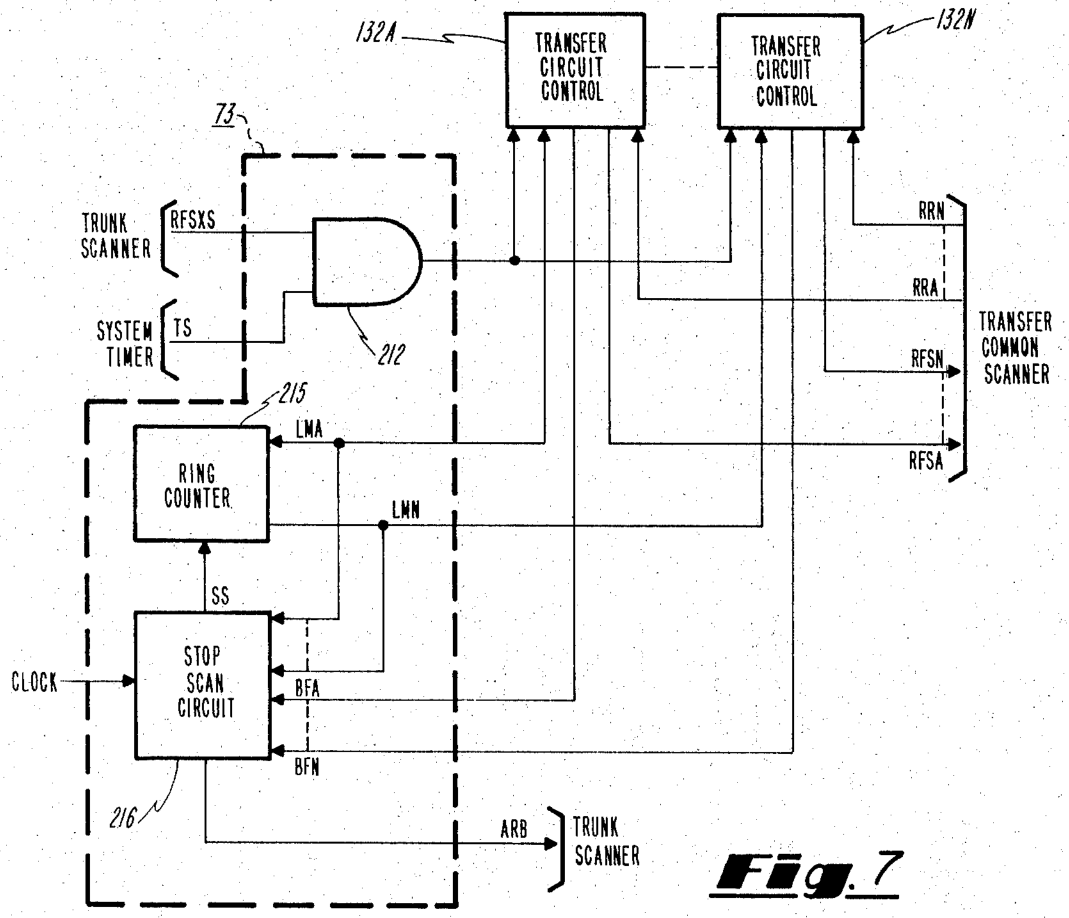
FIG. 7 is an expanded block diagram disclosing the rotary circuit connections to the transfer circuits, for preselecting a transfer circuit for connection in response to a subsequent transfer request.

The rotary 73, as illustrated in FIG. 7, comprises a ring counter 215, which when running, sequentially applies enabling signals to the transfer circuit controls 132 via the leads LMA–LMN, (wherein N corresponds to the number of transfer circuits which are serviced by the rotary 73). The leads LMA–LMN are also connected to a stop scan circuit 216 which includes a separate gating circuit for each of the transfer circuits. The busy-free leads BFA–BFN from the transfer circuit controls 132 are also connected to the stop scan circuit 216. Clock signals are applied to the ring counter 215 via the stop scan circuit 216 and lead SS so that as long as all of the transfer circuit controls are busy, the counter keeps running. A signal ARB is applied to the trunk scanner 89 when the ring counter 215 is running, indicating that all the transfer circuits controlled by the rotary 73 are busy. If a transfer circuit is free when scanned, its transfer circuit control 132 applies a signal on its corresponding BF lead which, in turn, inhibits the stop scan circuit 216 from transmitting clock pulses to the ring counter 215. The arrangement is such that the rotary 73 preselects the next free transfer circuit for connection prior to any request for transfer circuit by a trunk circuit. For example, if transfer circuit 75 including transfer circuit control 132A was preselected and then seized for transfer connection, the BFA lead signals the stop scan circuit 216 that the transfer circuit is busy and to apply clock pulses to the ring counter 215. The ring counter 215 will now proceed to scan the transfer circuits to preselect another free transfer circuit for a subsequent transfer request. Hence, the transfer circuits are preselected by the rotary and are awaiting a request for service.

The rotaries 73 in all transfer service groups are partially enabled when a transfer request signal RFSXS from the trunk scanner 89 is applied to an AND gate 212. The particular transfer circuit seized in a transfer circuit group depends upon the timing of the sequential enabling signals applied to the service circuits by the system timer 94. The system timer 94 sequentially and individually enables separate ones of various service circuit groups, such as an operator position service group and a transfer service group. Since a transfer request signal RFSXS is generated by the trunk scanner, the operator position service groups will not be partially enabled to respond to the enabling signals from the system timer. However, since the AND gates 212 in the rotaries in all transfer service groups are partially enabled, the first transfer service group having a preselected free transfer circuit will respond to the slotted time slot applied to the other input of the AND gate 212 to be seized for connection. At the time the AND gate 212 is enabled, a mark is extended from the transfer circuit to the OSLN 68 and a connection is completed between the transfer circuit and the trunk requesting transfer service. The seized transfer circuit also actuates its dedicated line circuit 20–22 for connection to a local register 34–36.

TRANSFER CIRCUIT PARTY STORE

Figure 8:
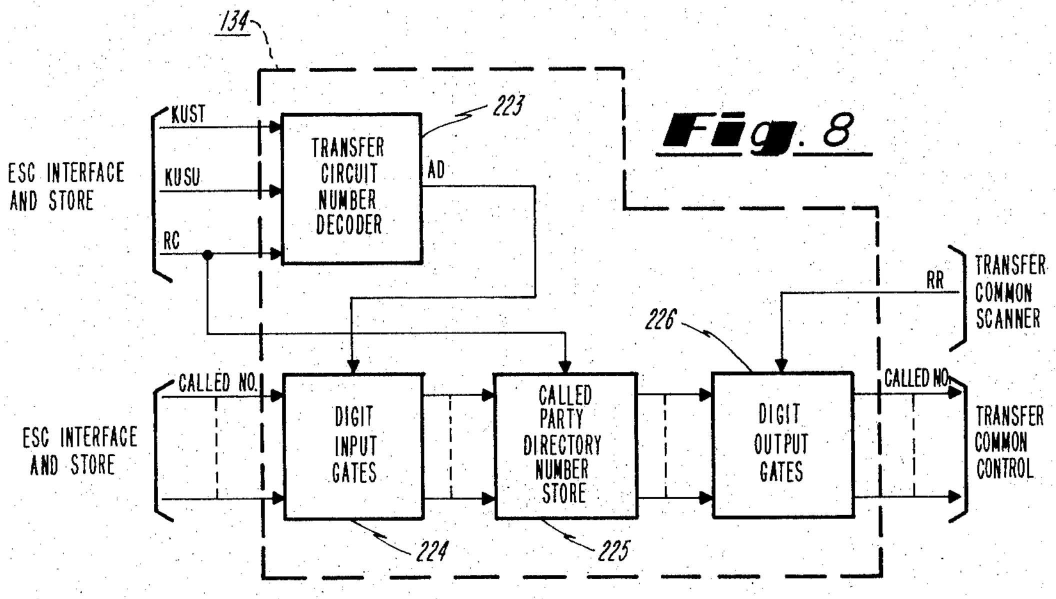
FIG. 8 includes an expanded block diagram of the transfer party store circuit of FIG. 6 for storing the number of the transfer party connected via the transfer circuit.

In FIG. 8, the address of the calling transfer circuit store 132 from the ESC interface and store 66 is applied to a number decoder 223 in all transfer circuits via lines KUST and KUSU. The enable signal RC is also applied. Only the addressed transfer circuit number decoder 223 will respond to apply an accept data signal AD to the digit input gates 224. The called party number is now received by a called party directory number store 225, which is also enabled by the signal on the lead RC. The called party directory number is stored until the call is rerouted by the transfer system and/or the transfer circuit released. The stored called party directory number is read by the transfer common control 136 when a reroute signal RR is applied to enable the digit output gate 226.

TRANSFER COMMON CIRCUIT

The function of the transfer common 86 is to service the transfer circuits in its transfer service group for call rerouting purposes. For example, when the calling party (party A) releases from a transfer circuit and the called party (party B) remains with the call, the transfer system automatically places a new call from the trunk involved to party B so that transfer circuit may be released to accept other transfer calls. The transfer common circuit provides the means by which the number of party B is automatically dialled.

To accomplish rerouting, the transfer circuit requiring service extends a request for service signal RFS to the transfer common circuit. The transfer common then calls in a register and commences automatic dialling of the number of party B using the digits received from the transfer circuit. A switch mark is subsequently returned from the register and is relayed to the trunk via the corresponding transfer circuit. The ESC connection to the party B line circuit is then accomplished in the normal manner using premature ring trip. At the end of the switch mark, the transfer common releases to service other transfer circuits requiring rerouting service. The transfer circuit also releases from the trunk.

Figure 9:
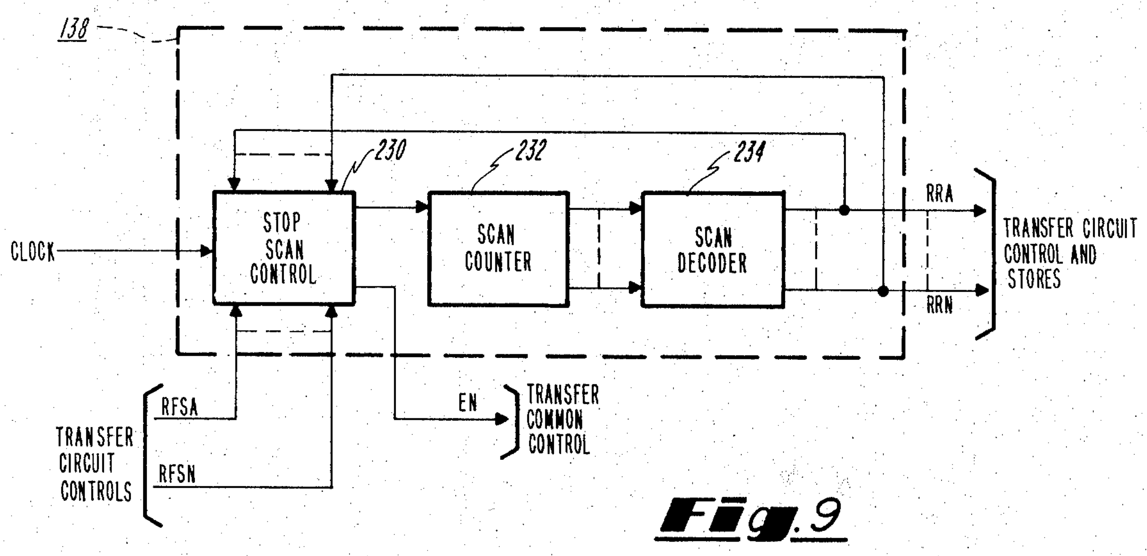
FIG. 9 is an expanded block diagram of the scanner circuit of the transfer common used to detect transfer circuits requesting reroute and for associating the transfer common with the transfer circuit for reroute purposes.
Figure 10:
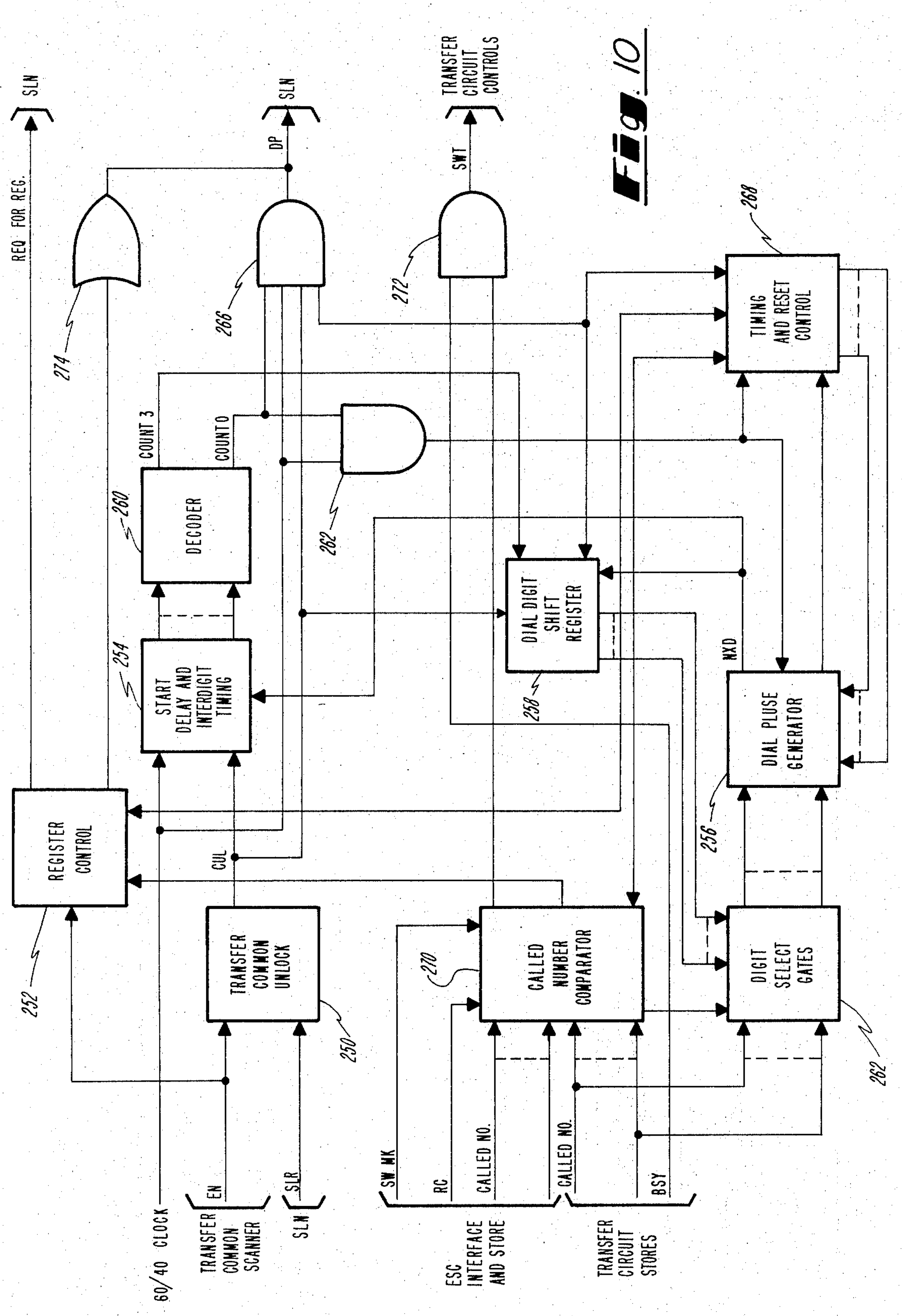
FIG. 10 is an expanded block diagram of the transfer common control including means for outpulsing the dial signals stored in the transfer party store, for comparing the dial signals outpulsed with those in the store to assure that proper dialling has been accomplished and for checking that the party so dialled is busy, thereby providing safeguards for assuring proper reroute connections.

The transfer common 86 includes a scanner circuit 138 illustrated in FIG. 9 and a control circuit 136 illustrated in FIG. 10. In FIG. 9, clock pulses are applied through a stop scan control circuit 230 to a scan counter circuit 232. Binary signals corresponding to the counts in the scan counter 232 are applied to a scan decoder 234, which, in turn, applies decoded output signals RRA–RRN to the scan stop circuit 230 and also to individual ones of transfer circuit controls 132 (FIG. 7). When a transfer circuit control being scanned applies a request for service signal on one of the lines RFSA–RFSN to the stop scan circuit 230, the transmission of clock pulses to the scan counter 232 is stopped and a continuous signal is applied on the corresponding one of the leads RRA–RRN to the transfer circuit controls and stores 132 and 134, respectively, to seize the transfer circuit. At the same time the stop scan circuit 230 also generates a signal EN to enable the transfer common control 132 to start the rerouting process.

At this time, the stop signal control circuit 230 applies an enable signal EN to a transfer unlock circuit 250 (FIG. 10) and to a register control circuit 252. In response to the enable signal EN, the register control circuit 252 marks the SLN for connection to a local register 34–36. When the connection to the local register is complete, a signal SLR is applied to the unlock circuit 250. The unlock circuit 250 includes a flip-flop circuit that is set by AND gating both the signals EN and SLR to provide a circuit unlock signal CUL. The unlock circuit 250 assures that no outpulsing can occur until a local register is connected. If the local register fails to be connected, the transfer common will remain locked until the system timer 94 (FIG. 3) steps to the next transfer service group.

Initially, the counter circuits in a start delay and interdigit timing circuit 254 and the dial pulse generator 256 are set at zero, while the first stage of the dial digit shift register 258 is set to the first digit for outpulsing.

The start delay and interdigit timing circuit 254 includes two flip-flop stages connected as a ring counter to count to the count of three and then return to zero at the next count, and remains locked in the zero position until enabled by the unlocked signal CUL. The clock pulses to the circuit 254 are 60/40 dial clock pulses that simulate ideal dial pulses; i.e., 40 milliseconds closed, 60 milliseconds opened, each pulse totaling 100 milliseconds. A decoder circuit 260 is connected to the counter output of the start delay and interdigit timing circuit 254 to produce an output signal when the counter has reached the count of three or at the count of zero. The count of three provides for a 400 millisecond delay after the unlock signal CUL was generated to allow the connected register circuit to stabilize prior to outpulsing. The count of three signal is applied to the dial digit shift register 258 so that the first stage in the shift register enables the digit select gates 262 to allow the first digit stored in the seized transfer circuit to be transmitted to the counter circuit in the dial pulse generator 256. The counter circuit in dial pulse shift register 258 includes five flip-flop stages connected as a shift register, one for each digit to be outpulsed (four) and a fifth flip-flop stage to be set when all digits are outpulsed.

The dial pulse generator 256 includes four flip-flop stages connected as a count down counter. The flip-flop stages are set in accordance with the digit to be outpulsed. With the digit stored in the dial pulse generator 256, an off zero signal NXO is applied to the dial digit shift register 258 to inhibit the register from enabling the digit select gates 262 and to cause the dial digit shift register 258 to shift the flip-flop stages to prepare for the next digit. In addition, the NXO signal stops the start delay and interdigit timing circuit 254 at the count of zero.

While the start delay and interdigit timing circuit 254 is on zero, an AND gate 264 is enabled to transmit the dial clock pulses to the dial pulse generator 256 to drive its counter to zero. For example, if the digit 6 is stored in the counter, it will take 6 dial pulses to step the counter to zero. Simultaneously, an AND gate 266 is enabled by the count of zero signal from decoder 260, the unlocked signal CUL, and a signal from the dial digit register 258 indicating that the fifth stage is not set, so that the gate 266 transmits the dial clock pulses to the register via the tip and ring leads from the lead DP. The dial pulses will be generated until the counter in the dial pulse generator 256 reaches the count of zero and restarts the start delay and interdigit timing circuit 254 (resulting in a removal of the count of zero enable signal from the gate 266).

After a 400 milisecond time delay (corresponding to the interdigit timing) the count of three signal is again generated by the decoder 260 to allow the dial digit shift register 258 to enable the digit select gates 262 to transmit the next digit to the dial pulse generator 256. This process is repeated for outpulsing the remaining digits.

After the dial pulse generator 256 outpulses the last digit, the off zero signal NXO going away sets the last stage in the dial digit shift register 258 which now disables the AND gate 266 preventing any further outpulsing. The same signal is applied to a timing and reset control circuit 268, enabling a called number comparator circuit 270 during the presence of a switch mark signal SWMK from the ESC interface and store 66. The comparator 270 compares the called number outpulsed into the local register (received via the ESC interface and store 66) with the called number stored in the transfer circuit. If the numbers compare, and if the transfer circuit provides an indication that the called line (party B) is busy, an AND gate 272 will be enabled to apply a switchthrough signal SWT to the transfer circuit allowing the second connection to be made to the called party B. The comparison of the called number stored in the transfer circuit store 134 to the called number outpulsed to the register assures that the proper number for rerouting has been dialled. In addition, the busy signal provides an added verification that the line number dialled is busy. This arrangement assures that the transfer circuit will not connect to another erroneous busy party, or ring a free party.

The timing and reset control circuit 268 includes an encoder circuit, which is enabled when the last flip-flop in the dial digit shift register 258 is set, to apply signals to set all flip-flops in the counter of the dial pulse generator 256. In the case of four dial digits, four flip-flop stages are set so that the dial pulse generator circuit 256 can function as a 1-½ second counter to provide a timing circuit for limiting the time duration that the transfer common can be connected to a given local register, thereby preventing the transfer service group from being locked in on a faulty local register. When the dial pulse generator 256 receives the encoded signal, an off zero signal is applied to the start delay and interdigit timing circuit 254 which allows the AND gate 264 to apply the dial clock pulses to the dial pulse generator 256 to drive the counter to zero. No dial pulses are transmitted by the AND gate 266 since the gate is disabled by the last flip-flop in the dial digit shift register 258. When the counter in the dial pulse generator 256 reaches a count of zero, it signals the timing and reset control 268, which, in turn, applies a release signal to the register control 252 to release the register.

In addition, if the called number comparator 270 does not provide a comparison by the end of the switch mark SWMK, the register control 252 receives the signal for releasing the register which in turn applies a signal through an inverter 274 on the lead DP that corresponds to an open in the tip and ring lines causing the register to release. When the register releases, the signal on the lead SLR is removed which prevents the transfer common from transmitting any further dial pulses. In addition, the removal of the unlocked signal CUL causes the shift register in the dial digit shift register 258 to return to its initial stage having its first flip-flop set. The unlocked signal CUL also causes the transfer common scanning circuit to release the reroute signal RR.

TRANSFER TRANSMISSION CIRCUIT

Figure 11:
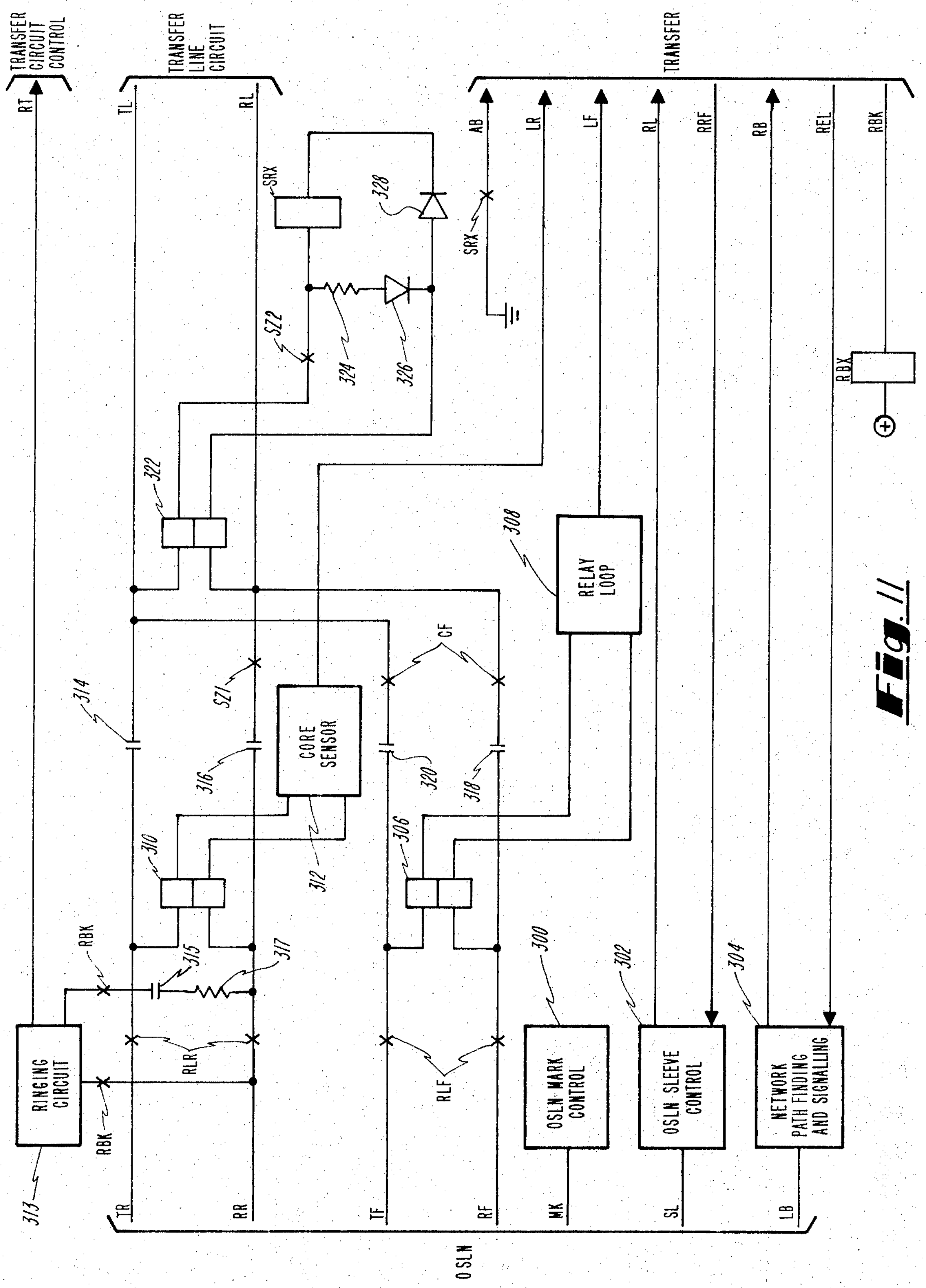
FIG. 11 is a schematic diagram, partially in block form, of the transmission circuit in the transfer circuits.

FIG. 11 includes an illustration of an embodiment of a transmission circuit for the transfer circuits 75 and 76. The transmission circuit includes seven leads extending to the OSLN 68, including a rear tip and ring pair (TR and RR), a front tip and ring pair (TF and RF), a mark lead (MK), a sleeve lead (SL), and a signalling and path finding lead (LB). The mark and sleeve leads MK and SL are connected to the OSLN mark and sleeve controls 300 and 302. These controls are fully explained in our above mentioned copending U.S. Pat. application entitled, "Operator Loop Complex", Ser. No. 293,752. The mark lead MK is used for marking connections to the OSLN for path finding purposes while the sleeve lead SL is used for maintaining the path closed once it has been established and also for signalling. The lead LB is connected to the network and path finding and signalling circuit 304 of the type described in our above mentioned copending U.S. Pat. application entitled, "Telephone Switching Network Signalling System," Ser. No. 92,588. The rear tip and ring lines TR and RR are used for connection to the party requesting transfer (party A). The front tip and ring pair TF and RF are used for connection to the outside world. In addition, each transfer circuit includes a direct connection to a transfer line circuit via a tip and ring pair TL and RL for connection to the called party (party B).

When a preselected transfer circuit is seized in a manner as previously described with regard to FIG. 5, the relays RLR and RLF (FIG. 11) pick up to close the contacts RLR and RLF, respectively. The front tip and ring lines TF and RF are connected through an impedance coil 306 to a relay loop circuit 308, which in turn, applies a DC load across the tip and ring lines TF and RF and places the outside world in a hold condition when the transfer circuit was initially seized. The relay loop circuit 308 also provides a signal on the lead LF when the loop is closed. The rear tip and ring lines TR and RR are connected through an impedance coil 310 to a core sensor circuit 312 for monitoring the party A connection for release, dial pulses, and hook flash. The core sensor 312 is of the type fully explained in the above cited U.S. Pat. application entitled, "Passive Junctor Circuit And Selectively Associated Junctor Control," Ser. No. 100,571. The rear tip and ring lines TR and RR are connected to the tip and ring lines TL and RL through the capacitors 314 and 316 and a contact SZ1. The tip and ring lines TL and RL are connected through the contacts CF and the capacitors 318 and 320 to the front tip and ring lines TF and RF. The tip and ring lines TL and RL are also connected through an impedance coil and contents SZ2 to a series circuit including a resistor 324 and a diode 326 in parallel with a second series circuit including a diode 328 and a relay SRX.

As previously mentioned above, when a transfer circuit is seized and the connection to a trunk circuit is completed, the contacts RLR and RLF close. The core sensor 312 and the relay loop 308 detect completed loop connections and provide signals on the leads LR and LF which operate a relay SZ (FIG. 11). The SZ relay, when operated, closes the contacts SZ1 wherein the audio path is completed to the transfer line circuit. At the same time the contacts SZ2 close to connect the series circuit including the resistor 324 and the diode 326 across the tip and ring lines TL and RL, to simulate an off hook condition in the transfer line circuit. The transfer line circuit is connected through the SLN to a local register 34–36. When a register is seized, dial tone is returned back to party A. In a case of pushbutton dialling, the signals are transmitted directly to the transfer line circuit through the capacitors 314 and 316. In the case of rotary dial, the dial pulses are detected by the core sensor 312 and repeated on lead LR wherein the transfer control circuit of FIG. 12 operates the relay SZ to repeat the dial pulses by the contacts SZ2. When all the dial pulses are received and called party B answers, the polarity of the battery across the tip and ring lines TL and RL is reversed, which in turn, operates the relay SRX which provides a ground on lead AB indicating that the connection is completed. At this time calling party A is now connected via the transfer circuit transmission path to called party B.

If party A hook flashes, the core sensor 312 repeats the hook flash on the lead LR and the transfer control circuit of FIG. 12 operates a relay CF which closes the contacts CF and connects the tip and ring lines TF and RF, TR and RR, and TL and RL in a three-way conference. A subsequent hook flash by party A is repeated on the lead LR and the transfer control circuit releases the transfer connection. If party A terminates the call, the core sensor 312 transmits the same and the transfer control circuit (FIG. 12) releases the relay RLR, which in turn, disconnects party A from the transfer circuit and sends a RSF signal to the transfer common 86 for rerouting purposes. After the reroute connection is completed and in response to a switch mark from the ESC interface and store 66, the transfer control circuit reoperates the relay RLR so that the core sensor 312 can monitor the busy-free condition of the second connection to called party B. If a free condition is found the transfer control circuit inhibits a release of the transfer connection.

A ringing circuit 313 is connected to the portion of the ring lead RR on one side of the contacts RLR, via contacts RBK, and to the portion on the other side of the contacts RLR, via contacts RBK, a capacitor 315, and a resistor 317. The ringing circuit 313 provides ringing signals for reringing party A and for providing ring-back tone to the outside world, in response to the operation of the relay RBK by the transfer control. When the party A answers, the ringing circuit sends a ring trip signal to the transfer control on the lead RT.

TRANSFER CIRCUIT CONTROL

The transfer circuit control 132 of FIG. 12 is the decision making and control portion of the transfer circuits 75 and 76. The transfer circuit control 132 completes the connections through the transmission circuit 130. In addition, the transfer circuit control 132 recognizes hook flash, release, and dial pulse signals and decides when a conference circuit is requested, when to release, when to reroute the transfer call, when to rering the party requesting transfer (party A) and when to release with a request for operator services.

The transfer circuit control 132 applies a rering signal to the calling party A in the event that party A hangs up in a situation where a connection cannot be made to the called party B (due to improper dialling, etc.) and provides ring-back tone to the outside world. If party A does not answer within a preset period of time, the transfer circuit control 132 generates a release signal for party A and signals for the connection of the outside world to the operator.

In the event that calling party A properly dials party B and then hangs up before party B answers, the transfer circuit control 132 applies ring-back tone to the outside world and releases the connection to party A. In the event that the called party B does not answer within the preset period of time, the transfer circuit control generates a time-out signal for connecting the outside world to the operator.

If party A hangs up after party B answers, the transfer circuit control 132 in response to a signal from the transmission circuit initiates a reroute request to the transfer common for releasing the connection to the calling party A. Various safeguards are employed in the reroute process to assure that the connection through the transfer circuit is not released until the additional reroute connection to party B is properly established.

When the called party B answers the call, the transfer control 132 monitors that parties A and B are connected together. If party A hook flashes a second time, the transfer circuit control recognizes a hook flash and signals the transmission circuit 130 to complete a conference connection between parties A and B and the outside world. In response to a third hook flash by party A, the transfer circuit control 132 initiates the release of the transfer circuit and called party B.

On the other hand, if party B hangs up while the transfer connection is extended between parties A and B, or the conference connection is established, the transfer circuit control 132 generates a signal to release the transfer circuit and called party B.

If the called party B is a trunk connection, then the transfer circuit control inhibits a conference connection, and in response to a second hook flash, generates a release signal for the transfer circuit and the called trunk (party B).

When a sleeve signal (from the transmission circuit 130) is initially present on the lead RL indicating that a connection between a trunk and a transfer circuit is established, the signals on leads RB, SWT and RSTR are such that the AND gates 408 and 410 are enabled to operate relays RLR and RLF respectively, completing the connection between the rear and front tip and ring pairs in the transmission circuit. The arrangement is such that during this initial connection of the trunk circuit to a transfer circuit, the signals present on lines RB, RSTR and SWT (at the inputs to OR gate 407 and AND gate 405) are such that the inverter 403 applies an enable signal to the gate 408 and that the AND gates 408 and 410 are enabled by the sleeve signal on lead RL. When the core sensor 312 (FIG. 11) applies a signal on lead LR indicating that calling party A is present, an AND gate 400 is enabled, which in turn, enables an AND gate 402 to operate the relay SZ. Relay SZ via its contacts SZ2 (FIG. 11) completes a loop across the dedicated transfer line circuit to seize a local register and dial tone is returned to the calling party A. As long as the end of dial (EOD) flip-flop 406 is not set, the gate 402 follows the dial pulses repeated on line LR so that the relay SZ repeats the dial pulses via contacts SZ2 to the local register.

A timer circuit 412 in conjunction with a second hook flash detector circuit 414 and a third hook flash detector circuit 416 monitor the line LR to determine if the party connected to the rear port (TR and RR) is dialling, hook flashing, or terminating. The timer circuit 412 includes a binary type counter that is used to provide the timing function. If the signal on lead LR is less than 200 milliseconds in duration, the signais considered to be a dial pulse. If the duration of the signal is between 200 milliseconds and 1.8 seconds, it is considered to be a hook flash and a corresponding signal is generated on lines HF1 and HF2. If the signal exceeds 1.8 seconds, it is considered to indicate termination and a signal RSTR is generated. A signal CBR is generated by the timer circuit 412 after a short time delay after the signal RSTR is generated and inhibits the timer circuit from counting any further until released.

As previously mentioned, the first hook flash is detected by the trunk circuit, which in turn, (if the trunk circuit is connected to an inside party having transfer class of service) requests a transfer circuit. Subsequent hook flashes are detected by the transfer circuit control 132. The second hook flash detector circuit 414 includes two flip-flop circuits. The third hook flash detector circuit 416 includes a third flip-flop circuit. The first flip-flop circuit is set by the signal HF1 from the timer circuit 412 when the signal on lead LR exceeds 200 milliseconds and prepares the second flip-flop circuit if the signal is less than 1.8 seconds. The combination of both flip-flop circuits provides a second hook flash signal CBF2. In response to a third hook flash, the second flip-flop circuit is set when the signal exceeds 200 milliseconds and transmits a signal so that the third flip-flop circuit is set if the third hook flash signal is shorter than 1.8 seconds. The flip-flop circuit, when set, provides signal CBF3 indicating a third hook flash has been detected.

An OR gate 426 is the general transfer circuit release gate that is enabled whenever the entire transfer circuit is to be released. An AND gate 484 is a rear port release gate that is enabled during reroute for only releasing the rear port tip and ring lines TR and RR to party A. An AND gate 485 is a reroute release gate that is enabled after the reroute process is complete to release the connection to called party B via the transfer circuit. Either general release OR gate 426 or the reroute release gate 485 will allow a release flip-flop 492 to be set via an OR gate 516. The OR gate 426 is enabled by any of eight AND gates 454–468.

The signal on lead CBF3 is applied to an AND gate 454 which is enabled if party A is still connected (indicated by a signal on the lead LR), to apply a signal to the general release OR gate 426. The AND gate 454 is provided for situations wherein the parties A and B and the outside world were connected in a conference circuit to consult with party B and with no intention to transfer the connection, wherein called party B is forcibly released by the third hookswitch flash.

When the transfer circuit is being totally released (as contrasted to rear port tip and ring leads TR and RR release for reroute), a remove bridges signal on lead RB is applied to the OR gate 407, which in turn, disables both of the AND gates 408 and 410 and releases both the relays RLR and RLF. If in the case of reroute, only the rear port tip and ring lines TR and RR (FIG. 11) are released. The signal RSTR from the timer circuit 412 (indicating that party A has terminated), disables only the AND gate 408 to release the relay RLR and the rear port tip and ring lines TR and RR. On the other hand, during switchthrough of the reroute connection, a switchthrough signal on lead SWT enables the gate 408 to operate the relay RLR a second time.

When dialling is complete the ESC interface and store 66 addresses the transfer circuit control 132 via lines KUST, KUSU and RC and an end of dial (EOD) flip-flop 406 is now set to disable the gate 402. However, the SZ relay continues to be operated via the inverter 420. As a result, after dialling is complete, the LR lead cannot pulse the relay SZ.

The ESC interface also provides a signal LO to a local call store circuit 440 to indicate that a local call and not a trunk call has been dialled. When the call is local, an AND gate 442 is enabled by both the local call store 440 and the second hook flash signal CBF2 to operate the relay CF and complete a conference connection. If the call was a trunk call, the local call store 440 is not set and therefore disables the AND gate 442 preventing a conference circuit. However, an AND gate 456 is enabled by the local call store circuit 440 (not local call), a signal on lead CBF2 (second hook flash) and by the flip-flop 406 (end of dialling) to apply a signal to the general release OR gate 426.

The lead AB provides an indication whether or not party B is connected. In the event that party B is not connected and the second hook flash is detected, the signals on leads AB and CBF2 enable an AND gate 458, which in turn, applies a signal to the general release OR gate 426. This allows the transfer circuit to be released in the event that party A hook flashes a second time before the called party B answers.

The AB lead is also connected to a party B store circuit 446 and to an AND gate 460. The party B store circuit 446 includes a flip-flop having an output connected to the AND gate 460. The flip-flop sets as soon as the connection to the called party B is complete. In the event that the called party B should thereafter hang up, the gate 460 is enabled to apply a signal to the general release OR gate 426.

The AND gate 462 is enabled to apply a signal to the general release OR gate 426 after the transfer circuit has been seized and the calling party A requests an operator by dialling "O." The KUST and KUSU signals from the ESC interface and store 66 are AND gated by gate 450 and are applied to AND gate 462 so that the AND gate 462 is enabled by a DOX signal indicating the operator has been dialled.

The OR gate 464 is enabled to apply a signal to the general release OR gate 426 when party B is connected to the transfer circuit and the subsequently hangs up wherein sleeve signal RL is present and the lead LF indicated party B terminated.

The AND gate 466 is enabled to apply a signal to the general release OR gate 426 when party A has dialled a trunk via the transfer circuit and then terminates the call. The AND gate 466 is enabled by: a signal on lead CBR from the timer circuit 412 indicating that the calling party A terminated, an end of dial signal from the gate 420, and a trunk call signal from the local call store 440.

In the event that the connection to called party B has not been established and party A terminated his call, the transfer circuit will rering calling party A rather than terminating the connection. If the calling party A does not answer within a preset period of time a signal is generated on lead OP indicating that operator services are requested. The AND gate 468 is enabled by the signal on lead OP and a signal on the lead RT indicating calling party A did not answer, to apply a signal to the general release OR gate 426.

An AND gate 474 is enabled if the calling party A releases on a local call (lead LO) before called party B answers (lead AB), before end of dialling (flip-flop 406), and after party A has terminated (lead CBR). When AND gate 474 is enabled, a signal is applied to line RBK to enable the ringing circuit 413 in the transmission circuit to rering calling party A and send ringback tone to the outside world. The signal on lead RBK also starts a thirty second timer circuit 480. After the thirty second time-out, an AND gate 482 is enabled to generate an operator request signal on lead OP.

In the event that the connection to the called party B has been established and calling party A terminates his call, the connection to party B is reestablished via the reroute process. In the reroute process only the rear port tip and ring lines (TR and RR) (to party B) are initially released. A reroute request gate 484 monitors: the presence of party B on leads ABCK and AB, the lead LO to determine that the call is a local call, and the lead CBR to determine if calling party A has terminated. If the call is a local call, the party B is present and party A has terminated, the gate 484 is enabled to apply a request reroute signal RRQ to a reroute request store 510 and a rear port release OR gate 500. The OR gate 500 transmits a rear port release signal at time slot seven (TS7) to the trunk circuit via an OR gate 496 to signal the trunk to release the rear port tip and ring lines CTR and RR). The reroute request store 510 includes a flip-flop that generates the RFS signal to seize the transfer common and thereafter inhibit OR gate 500. When the transfer common scanner scans the transfer circuit on lead LM, an AND gate 512 is enabled to put out the BF signals.

After the rear port tip and ring lines TR and RR are released, the party B number is outpulsed and compared, and if the party B line is found busy, the switchthrough signal SWT is applied to the reroute release AND gate 485 indicating that the proper party has been dialled and switched through. Now two connections are established to party B, a first from the party B line circuit from the transfer circuit to the trunk and the second from the party B line circuit to the trunk and back down to the transfer circuit on the rear port tip and ring lines (TR and RR). As previously mentioned, the switchthrough signal SWT also operates the RLR relay which reconnects the core sensor 312 to the rear tip and ring lines. The core sensor 312 is now monitoring the second connection to party B.

The reroute release AND gate monitors: the lead RR for a reroute indication, lead SWT for a switchthrough signal, lead BSY for an equipment busy signal indicating that a path for the second connection is available, lead CBR indicating that party B (replacing party A) has not terminated, lead LO indicating that the call is a local call, and lead LR indicating that the party B (replacing party A) is present. If the ESC equipment is busy, the BSY signal will prevent the AND gate 485 from being enabled so that the reroute process can continue until the equipment is free. The reroute release AND gate 485, when enabled, prepares a release flip-flop 492, via the OR gate 516 and also resets the route request store by line RRR. As previously mentioned, the release flip-flop 492 is also prepared by the general release OR gate 484. The flip-flop, when prepared by the AND gate 485 or the gate 426, is set by the first time slot (TS1) in the next timing frame to initiate the release sequence at the beginning of the next timing frame.

Various time slotted signals are used to control the timing and transmission of the supervisory signalling through the OSLN indicating the type of release to be made. The use of the time slotted signals in marking, holding and releasing circuits connected to the OSLN is described in detail in our above mentioned copending U.S. Pat. application entitled, "Operator Loop Complex," Ser. No. 293,752, and will apply to the transfer circuits. There are ten time slotted signals in a repeating sequence wherein: time slot 1 is used for path finding, time slot 9, alone, is used for a general transfer circuit release, time slot 6 with time slot 9 in the same frame is used for transfer circuit release with a request for operator, and time slot 7 is used for a rear port tip and ring lines TR and RR release for reroute purposes which is followed by time slot 9 after reroute is completed to perform a release.

For general transfer circuit release, (with the flip-flop 492 set) an AND gate 494 is enabled at time slot 9 to apply a release signal on lead REL (via the OR gate 496) to the network path finding and signalling circuit 304 in the transmission circuit. In the event that the transfer circuit is to be released so that the trunk requests a connection to the operator, an AND gate 498 is enabled by: the operator request signal on lead OP, a signal on lead SUL indicating the release flip-flop 492 was set, and the occurrence of a time slot signal TS6. The AND gate 498 applies a signal at time slot 6 on the lead REL via the: OR gate 496. Three time slots later (TS9) the AND gate 494 is enabled to perform a general release. In the event that only the rear port tip and ring lines (TR and RR) connected to calling party A are to be released (such as in the case of reroute) and the AND gate 500 is enabled by the AND gate 484 at time slot 7 to transmit a signal at time slot 7 on the lead REL via the OR gate 496.

A trunk requesting transfer which is the subject of our above mentioned copending U.S. Pat. application entitled, "Trunck Circuit Having Selective Interface Combinations," Ser. No. 293,571, responds to the time slotted signals applied to the lead REL and transmitted to the trunk via the network path finding and signalling system 304 and the OSLN. The arrangement is such that the time slotted signal TS9 by itself causes the trunk to release the entire transfer circuit. The occurrence of time slotted signal TS7 causes the trunk circuit to only release the rear port tip and ring lines TR and RR for the reroute process. Once the reroute process is complete, a signal TS9 is sent to the trunk to release the entire transfer circuit. In the event of an operator request type of release, the signals TS6 and TS9 are applied to the lead REL in the same frame wherein the trunk releases the transfer circuit but also generates a QRFS signal to signal queue for a connection to the operator. The release of the transfer circuit is controlled by signals over the OSLN sleeve lead RL. As previously mentioned, the relays SZ, RLR and RLF are under the control of the signal on the sleeve lead RL. When a transfer circuit is released by a trunk, a signal on the sleeve lead RL releases the relays SZ, RLR and RLF disconnecting the transfer circuit and removing the off hook condition on the transfer line circuit.

What is claimed is:

1. A transfer system for use in a common control private automatic branch exchange having a plurality of trunk circuits for establishing telephone connections between inside and outside parties and a service circuit complex through a switching network comprising; a plurality of transfer circuit means connected between the switching network and the private automatic branch exchange, each being responsive to the connection of a trunk circuit thereto and the receipt of dial pulses therefrom to complete a transfer connection from the trunk circuit to a transfer party through the transfer circuit means and, each including storage means for storing the dial pulses, and circuit means for detecting when the inside party, other than the transfer party, terminates to generate a reroute signal, circuit means responsive to the termination of the inside party other than the transfer party for establishing a second connection between the transfer party and the trunk circuit through the private automatic branch exchange and thereafter releasing the transfer connection, said circuit means including a transfer common circuit for association with a transfer circuit means generating a reroute signal for outpulsing the dial signals stored therein to establish the second connection, and control circuit means for receiving transfer requests from the trunk circuits for connecting the trunk circuits to any free transfer circuit means through said switching network.

2. A transfer system as defined in claim 1 wherein said transfer common circuit includes circuit means for comparing the dial signals outpulsed to the dial signals stored in said storage means to initiate the release of the transfer circuit means when a comparison is made.

3. A transfer system as defined in claim 2 wherein said transfer common circuit includes circuit means for inhibiting the release of the transfer circuit means if the party connected by the outpulsed dial signals is free.

4. A transfer system as defined in claim 3 wherein each of said plurality of transfer circuit means includes circuit means responsive to a signal from the inside party other than the transfer party, transmitted thereto via the connected trunk, to establish a conference connection between the outside party, the inside party and the transfer party provided the transfer party is an inside party and if the transfer party is an outside party to release the transfer connection.

5. A transfer system for a private automatic branch exchange including a plurality of line circuits and a plurality of trunk circuits connected to opposite ends of a switching network arrangement and common control means for effecting connection of any of said line circuits to any of said trunk circuits through sais switching network, said transfer system comprising:

a plurality of transfer line circuit means connected to the line circuit end of the switching network;

a service switching network means having one end connected to said plurality of trunk circuits;

transfer circuit means connected between the other end of said service switching network means and said transfer line circuit means, responsive to the connection of the trunk circuits thereto to pass dial signals from connected ones of said trunk circuits to the common control to establish transfer connections between the telephone equipment designated by the dial signals and the trunk circuits through paths including said service switching network, said transfer circuit means, said transfer line circuit means and the switching network, said transfer circuit means including a plurality of transfer circuits, each being connected to a separate transfer line circuit means, and each including storage means for storing dial signals received from a trunk circuit connected thereto, and circuit means for generating a reroute signal for completing the transfer, and circuit means for seizing the common control for effecting second connections directly through said switching network between the trunk circuits and the telephone equipment interconnected through the transfer connections, and subsequently releasing the transfer connections, said circuit means including means for outpulsing the dial signals stored in the transfer circuits generating reroute signals and comparing the dial signals outpulsed with that in the stores prior to releasing of the transfer circuits.

6. A transfer system for a private automatic branch exchange including a plurality of line circuits and a plurality of trunk circuits connected to opposite ends of a switching network arrangement, common control means for effecting connection of any of said line circuits to any of said trunk circuits through said switching network to establish telephone connections between inside and outside parties, a service switching network and control for connecting the trunks to a service circuit complex in response to service requests, said transfer system comprising:

a plurality of transfer circuits, each being connected to the service switching network and to separate ones of the line circuits, said transfer circuits upon being connected to any trunk circuit through the service switching network actuate its connected line circuit to seize said common control to transmit thereto dial signals received from the connected trunk circuit to establish a transfer connection between said trunk circuit and the dialed telephone circuit through the transfer circuit its connected line circuit and said switching network, said transfer circuit including storage means for storing said dial signals and circuit means for determining when the connection to the dialed telephone circuit is closed and the line circuit opens thereafter to generate a reroute signal;

transfer common circuit including scanning means for scanning said plurality of transfer circuits for detecting a transfer circuit generating a reroute signal, circuit means for outpulsing the number stored in the detected transfer circuit to said common control for establishing a second connection between the dialed telephone circuit and the corresponding trunk circuit directly through said switching network and releasing the connection to the line circuit, and circuit means for comparing the dialed signals with the dial signals outpulsed for releasing the transfer circuit from the connected trunk if the comparison is made, and circuit means connected to said common control means for receiving a busy-free indication of the dialed telephone circuit, and for enabling said comparison circuit means only if said telephone circuit is busy.

7. A transfer system as defined in claim 6 including:

circuit means for scanning the busy-free condition of said plurality of transfer circuits for preselecting the next transfer circuit to be connected to a trunk circuit.

8. A transfer system for a telephone exchange including a plurality of line circuits and a plurality of trunk circuits connected to opposite ends of a switching network arrangement, common control means for effecting connection of any of said line circuits to any of said trunk circuits through said switching network, and wherein the trunk circuits, when involved in connections between an outside party and a local party via the switching network, are responsive to signals from the local party to generate a transfer request signal, said transfer system comprising:

a plurality of transfer line circuit means connected to the line circuit end of the switching network;

service switching network means for connecting any one of the plurality of trunk circuits to transfer circuit means;

transfer circuit means responsive to a connection to the trunk circuits through the service switching network means to associate a separate one of said transfer line circuit means with a separate trunk circuit connected thereto to seize the common control and transmit dial signals received from said trunk circuit to said common control to establish transfer communication connections between the trunk circuits and the dialled telephone circuit, said transfer communication connection extending through said service switching network, said transfer circuit means, said transfer line circuit means and the switching network;

control circuit means responsive to transfer request signals generated by the trunk circuits for connecting any of the trunk circuits to the transfer circuit means through said service switching network means, and circuit means responsive to a termination by the local party for effecting a second connection between the corresponding trunk circuit and the dialled telephone circuit directly through said switching network and releasing the corresponding transfer connection.

9. A transfer circuit complex for a private automatic branch exchange comprising:

a plurality of transfer circuits each including first and second transmission lines for connection to trunk circuits through a switching network and a third transmission line for connection to a line circuit, circuit means responsive to the connection of a transfer circuit to a trunk circuit for completing a telephone connection between the first and third transmission lines, circuit means for storing dial pulses received on said first transmission line, circuit means responsive to a first signal on said first transmission line for connecting said first, second and third transmission lines in a telephone conference connection, and circuit means responsive to a second signal on said first transmission line for generating a reroute signal, and transfer common circuit means including circuit means for detecting the transfer circuits generating reroute signals, circuit means for outpulsing the dial signal stored in the detected transfer circuit, circuit means for comparing the dial signals outpulsed with the dial signal in the storage means to generate a release signal for the first, second and third transmission lines, and circuit means for receiving a signal indicating the busy-free status of the equipment corresponding to the dial signals outpused and inhibiting the said comparison circuit means from generating said release signal if said equipment is free.

10. A transfer circuit complex as defined in claim 9 wherein said transfer circuits include:

circuit means for detecting when a connection has been established to the third transmission line and then subsequently released for releasing said first, second and third transmission lines.

11. In a telephone system including a plurality of line circuits and trunk circuits and a switching system for interconnecting the line circuits to the trunk circuits by a common control circuit that provides indications as to the numbers dialed, the busy-free status of the dialed numbers, and whether the dialed number was a line circuit number, and including switching means for connecting the trunk circuit to a service complex, a transfer system comprising:

a plurality of transfer circuits, each being connected between the switching means and separate ones of said line circuits and including circuit means responsive to a connection of a trunk circuit thereto to complete a telephone connection to the corresponding line circuit for transmitting dial signals from a line circuit connected to the trunk circuit thereto, to establish a first telephone connection to the dialed telephone circuit through the transfer circuit and line circuit connected thereto, circuit means for storing the dial signals and circuit means for generating a reroute signal when the connection to the dialed telephone circuit is complete and the line circuit hangs up;

transfer common circuit means including circuit means responsive to a transfer circuit generating a reroute signal for transmitting the dial signals stored in the transfer circuit to the common control to establish a second telephone connection between the dialed telephone circuit and the trunk directly through the switching system, circuit means for comparing the transmitted dial signals to the common control with the dial signals stored in the storage means and being responsive to a busy indication of the dialed telephone circuit to complete the second connection and release the first connection;

a rotary circuit connected to said transfer circuit for preselecting an unconnected transfer circuit for connection to a trunk circuit subsequently requesting transfer services, and circuit means for determining that dial signal transmission by the transfer circuit is incomplete and is responsive to the dialing line circuit thereafter hanging up for reringing the dialing line circuit.

12. A transfer service complex as defined in claim 11 wherein each of said transfer circuit means include:

circuit means, responsive to the completion of the first telephone connection and a signal from the trunk circuit, to complete a telephone conference connection between the parties connected to the trunk circuit and the party connected to the dialled telephone circuit when the common control indicates the dialled telephone circuit is another line circuit.

13. A transfer service complex as defined in claim 12 wherein each of said transfer circuit means include:

circuit means for releasing the transfer connection to the trunk circuit when the dialled telephone circuit disconnects.

14. A transfer service complex as defined in claim 11 wherein each of said transfer circuit means include:

a timing circuit for releasing the transfer circuit if the dialling line circuit does not respond to the rering signals within a preset period of time.

15. A transfer service complex as defined in claim 14 wherein each of said transfer circuit means include:

circuit means responsive to the expiration of the preset period of time for transmitting a signal to the trunk circuit prior to release for preparing the trunk circuit to initiate an operator request.

16. A transfer service complex as defined in claim 11 wherein:

each of said transfer circuits include a storage circuit for storing the reroute signal;

wherein said transfer common includes a scanner circuit for detecting said transfer circuits storing the reroute signal and associating said transfer common with the transfer circuit having the detected reroute signal, and wherein said transfer circuit means includes circuit means for removing said reroute signal from said storage means when said second connection is complete to release the associated transfer common circuit means.

17. A transfer circuit complex as defined in claim 12 wherein:

each of said transfer circuits include two transmission line connections to the trunk circuit connected thereto wherein a first connection is for a line circuit connected to the trunk circuit via the switching system and a second connection is for a connection to a party outside the telephone system and a third transmission connection directly to a line circuit, and said circuit means for completing the conference connection interconnects said three transmission connections.

18. A transfer service complex as defined in claim 15 wherein each of said transfer circuit means include:

means for signalling said trunk circuit through the switching means by a plurality of time slotted sequential switching time slots in a repeating frame of time slots wherein one of the slotted signals in the frame signals a release signal to said trunk circuit, another time slot signal signals the trunk circuit to request an operator after release and another time slot signal signals the trunk to release the first transmission connection.

19. A transfer system for use in a common control telephone exchange that provides indications as to the transfer class of service provided to inside parties at the time connections are being established to the inside parties, said transfer system comprising:

a plurality of trunk circuits for use in telephone connections between inside and outside parties, each of said trunk circuits having storage means for storing the transfer class of service of an inside party connected thereto, circuit means for detecting when the inside party signals for transfer service, and circuit means for generating a transfer request if the inside party connected thereto has transfer class of service;

circuit means for transmitting the transfer class of information from the telephone exchange to the trunk circuit that corresponds to the inside party connected thereto at the time the connection to the inside party is established;

a plurality of transfer circuit means connected to the telephone exchange, each being responsive to the connection of a trunk circuit thereto and the receipt of dial pulses from the inside party transmitted via that trunk circuit to complete a transfer connection from the trunk circuit to a transfer party through the transfer circuit and the telephone exchange, circuit means responsive to the termination of the inside party for establishing a second connection between the transfer party and the trunk circuit directly through the telephone exchange and thereafter releasing the transfer connection, and control circuit means including a switching network for receiving transfer requests from the trunk circuits for connecting the trunk circuits to any free transfer circuit means through said switching network.

20. A transfer system for use in a common control telephone exchange that provides indications as to the transfer class of service provided to inside parties, the dial signals received, the identification of the signalling circuit sending the dial signals, whether the dialled party is an inside party and the busy-free status of the dialled party, at the time connections are being established to the inside parties, said transfer system comprising:

a plurality of trunk circuits for use in telephone connections between inside and outside parties, each of said trunk circuits having storage means for storing the transfer class of service of an inside party connected thereto, circuit means for detecing when the inside party signals for transfer service, and circuit means for generating a transfer request if the inside party connected thereto has transfer class of service;

circuit means for transmitting the transfer class of information from the telephone exchange to the trunk circuit that corresponds to the inside party connected thereto at the time the connection to the inside party is established;

a plurality of transfer circuit means connected to the telephone exchange, each being responsive to the connection of a trunk circuit thereto and the receipt of dial pulses from the inside party transmitted via that trunk circuit to complete a transfer connection from the trunk circuit to a transfer party through the transfer circuit and the telephone exchange, circuit means responsive to the termination of the inside party for establishing a second connection between the transfer party and the trunk circuit directly through the telephone exchange and thereafter releasing the transfer connection, and control circuit means including a switching network for receiving transfer requests from the trunk circuits for connecting the trunk circuits to any free transfer circuit means through said switching network.

21. A transfer system as defined in claim 20 wherein:

each of said transfer circuit means includes the storage means for storing the dial pulses, and circuit means for detecting when the inside party terminates to generate a reroute signal, and said circuit means includes a transfer common circuit for association with a transfer circuit means generating a reroute signal for transmitting the dial signals stored therein to establish the second connection.

22. A transfer system as defined in claim 21 wherein said transfer common circuit includes:

circuit means for comparing the indication of dial signals received by the telephone exchange to the dial signals stored in said storage means to initiate the release of the transfer circuit means when a comparison is made.

23. A transfer circuit as defined in claim 22 wherein said transfer common includes:

circuit means responsive to the indication of the identification of the signalling circuit by the telephone exchange to enable the comparison circuit means when the transfer common is identified.

24. A transfer system as defined in claim 22 wherein said transfer common circuit includes:

circuit means for inhibiting the release of the transfer circuit means if the telephone exchange indicates that the transfer party is free.

25. A transfer system as defined in claim 22 wherein each of said plurality of transfer circuit means includes:

circuit means responsive to a signal from the inside party transmitted thereto via the connected trunk, to establish a conference connection between the outside party, the inside party and the transfer party provided that the telephone exchange indicates the transfer party is an inside party, and if the transfer party is indicated to be an outside party to release the transfer connection.

26. A transfer system as defined in claim 20 wherein each of said transfer circuit means include:

circuit means for determining that dial signal transmission by the transfer circuit is incomplete and is responsive to the inside party thereafter hanging up for reringing the inside party.

27. A transfer system as defined in claim 26 wherein each of said transfer circuit means include:

a timing circuit for releasing the transfer circuit if the inside party does not respond to the rering signals within a preset period of time.

28. A transfer system as defined in claim 27 wherein each of said transfer circuit means include:

circuit means, responsive to the expiration of the preset period of time, for transmitting a signal to the trunk circuit prior to release for preparing the trunk circuit to initiate an operator request.

29. A transfer common circuit for transfer circuits having dial signals stored therein and generating a reroute request signal, said transfer common circuit comprising:

scanning means for scanning said transfer circuits for detecting a transfer circuit generating a reroute signal and associating the transfer common circuit therewith;

a gating circuit for selecting individual digits of the dial signal stored in the associated transfer circuit to be transmitted;

first circuit means responsive to the association of the transfer common circuit to a transfer circuit for sequentially enabling the gating circuit for selecting the individual digits of the stored dial signals and for transmitting the digits in sequence;

second circuit means for comparing the dial signals transmitted with the dial signals stored in the associated transfer circuit to provide a release signal to the transfer circuit, and third circuit means responsive to a signal indicating that the equipment associated with the dial signal transmitted is busy to enable said comparison means.

30. A transfer common circuit as defined in claim 29 including:

fourth circuit means for signalling for a register circuit, and a time-out circuit means enabled by the transmission of the last digit stored in the associated transfer circuit for inhibiting said fourth circuit means after a preset time-out period.

31. A transfer common circuit as defined in claim 29 wherein said first circuit means includes:

a timing circuit for providing a dial signal interdigit timing signal;

a shift register including at least one stage for each dial digit to be outpulsed connected to said timing circuit to shift a bit therein for each interdigit timing signal received and for inhibiting the timing circuit when the stage of the last digit is set;

a count down counter connected to the gating circuit to store the dial digit to be outpulsed and being responsive to dial pulse timing signals applied thereto to count down the dial digit set therein and thereafter enable the timing circuit, and circuit means responsive to said interdigit timing signals to apply dial pulse timing signals to said count down counter.

* * * * *